(12) United States Patent
Yang et al.

(10) Patent No.: US 9,804,919 B2
(45) Date of Patent: Oct. 31, 2017

(54) SYSTEMS AND METHODS FOR CORRELATION BASED DATA ALIGNMENT

(71) Applicant: Avago Technologies General IP (Singapore) Pte. Ltd., Singapore (SG)

(72) Inventors: Yuqing Yang, Shanghai (CN); Shaohua Yang, San Jose, CA (US); Xuebin Wu, San Jose, CA (US); Qi Zuo, Shanghai (CN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 97 days.

(21) Appl. No.: 14/803,202

(22) Filed: Jul. 20, 2015

(65) Prior Publication Data

US 2017/0024274 A1     Jan. 26, 2017

(51) Int. Cl.
*H04L 7/04* (2006.01)
*G06F 11/10* (2006.01)

(52) U.S. Cl.
CPC ...... *G06F 11/1004* (2013.01); *G06F 11/1076* (2013.01)

(58) Field of Classification Search
CPC .......................................................... H04L 7/048
USPC ........................................ 714/775, 774, 770
See application file for complete search history.

(56) References Cited

U.S. PATENT DOCUMENTS

| | | | |
|---|---|---|---|
| 6,774,826 B2 | 8/2004 | Han et al. | |
| 7,974,034 B1 | 7/2011 | Han et al. | |
| 8,279,546 B1 | 10/2012 | Han et al. | |
| 8,345,369 B2 | 1/2013 | Xia et al. | |
| 8,619,385 B1 | 12/2013 | Guoxiao et al. | |
| 8,687,301 B1 | 4/2014 | Zhang et al. | |
| 8,810,934 B2 | 8/2014 | Aubele et al. | |
| 8,861,122 B1 | 10/2014 | Hwang et al. | |
| 2006/0067592 A1* | 3/2006 | Walmsley | B41J 2/2139 382/303 |
| 2007/0136642 A1* | 6/2007 | Eberdorfer | G11B 20/00086 714/770 |
| 2008/0014917 A1* | 1/2008 | Rhoads | G06F 3/017 455/422.1 |
| 2009/0271670 A1 | 10/2009 | Tan et al. | |
| 2011/0102258 A1* | 5/2011 | Underbrink | G01S 19/37 342/357.47 |
| 2011/0205653 A1 | 8/2011 | Mathew et al. | |
| 2012/0124241 A1 | 5/2012 | Yang et al. | |
| 2012/0313817 A1* | 12/2012 | Underbrink | G01S 19/37 342/357.72 |
| 2015/0317204 A1* | 11/2015 | Yang | G06F 11/1068 714/764 |

OTHER PUBLICATIONS

U.S. Appl. No. 12/946,048, filed Nov. 15, 2010, Yang.
U.S. Appl. No. 12/894,221, filed Sep. 30, 2010, Yang.
U.S. Appl. No. 14/268,741, filed May 2, 2014, Hwang.
U.S. Appl. No. 14/177,496, filed Feb. 11, 2014, Yang.

* cited by examiner

*Primary Examiner* — Fritz Alphonse
(74) *Attorney, Agent, or Firm* — Sheridan Ross P.C.

(57) ABSTRACT

Embodiments of the present inventions are related to systems and methods for data processing, and more particularly to systems and methods for recovering data where synchronization information is not detected.

20 Claims, 11 Drawing Sheets

SYSTEMS AND METHODS FOR CORRELATION BASED DATA ALIGNMENT

BACKGROUND

Embodiments of the present inventions are related to systems and methods for data processing, and more particularly to systems and methods for recovering data where synchronization information is not detected.

In some cases data processing relies upon synchronization information included in the data to be processed. Using the synchronization information data is framed for application of a data decoding algorithm. Where, however, the synchronization is not detected or is not detectable due to noise or other factors, data decoding may not operate properly. In some cases, the data may be repeatedly re-framed and the data re-decoded using the different framing until the original data is recovered. Such a process, however, is costly in terms of processing time.

Hence, for at least the aforementioned reasons, there exists a need in the art for advanced systems and methods for data processing.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1b depicts an example user data set stored between the instances of the servo wedges of FIG. 1a;

DETAILED DESCRIPTION

Figure 1A:
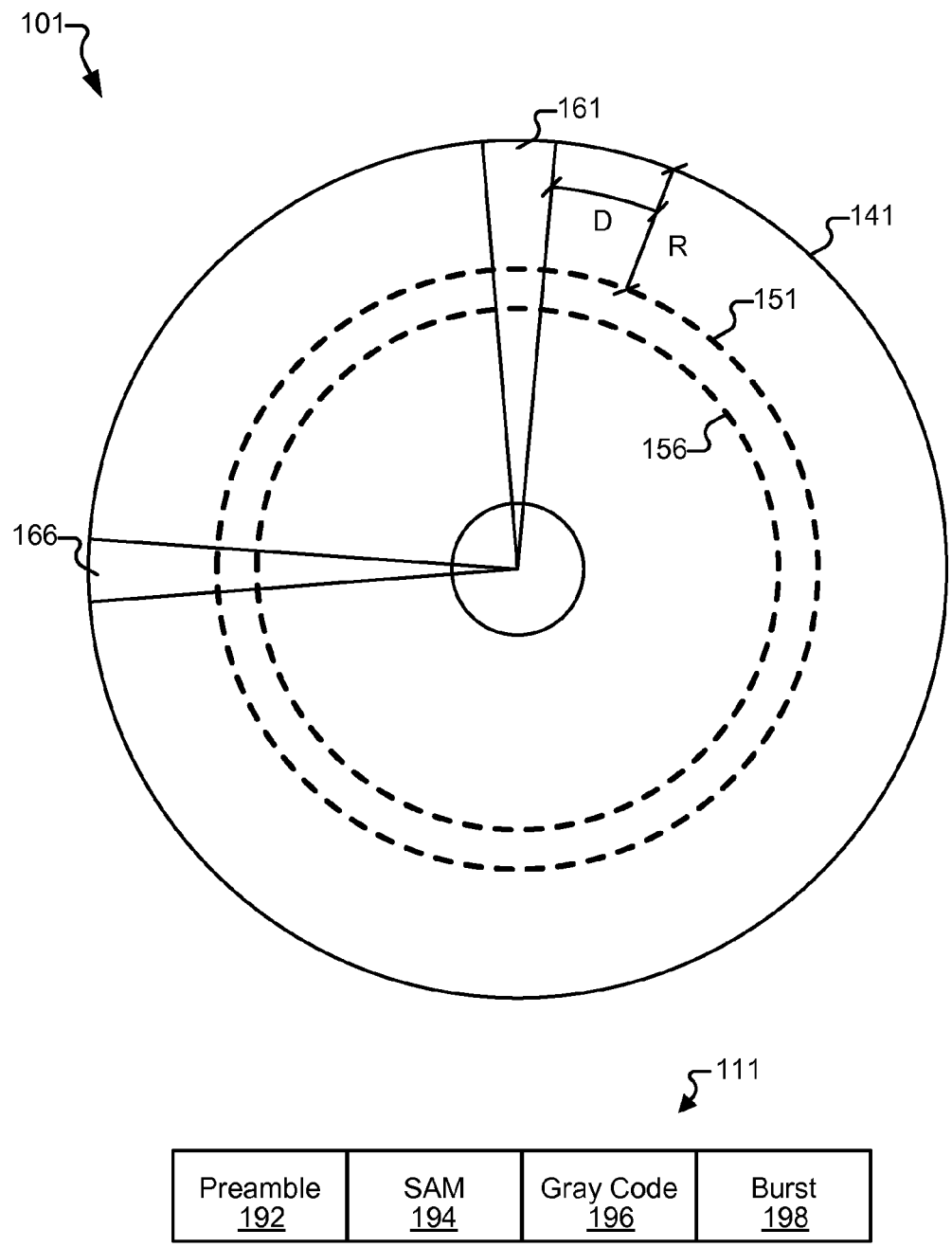
FIG. 1a depicts an existing storage medium including servo wedges maintaining servo data.

Embodiments of the present inventions are related to systems and methods for data processing, and more particularly to systems and methods for recovering data where synchronization information is not detected.

Various embodiments of the present invention provide data processing systems that include: a sample buffer circuit, a data detector circuit, a data decoder circuit, and a mis-alignment determination circuit. The sample buffer circuit is operable to store a sample data set. The data detector circuit operable to apply a data detection algorithm to the sample data set to yield a detected output where a fragment of the sample data set is mis-aligned. The data decoder circuit is operable to apply a data decoding algorithm to a decoder input to yield an interim output. The decoder input is derived from the detected output. The mis-alignment determination circuit is operable to determine a mis-alignment value of the sample data set based upon a combination of the detected output and the interim output.

In some instances of the aforementioned embodiments, the system further includes a sync mark detection circuit operable to identify a sync mark in a received data set. In such instances, a mis-alignment of the sample data set is caused by a failure of the sync mark detection circuit to identify the sync mark in the received data set. In one or more instances of the aforementioned embodiments, the data decoder circuit is a low density parity check decoder circuit. In various instances of the aforementioned embodiments, the data detector circuit is a maximum a posteriori data detector circuit. In some instances of the aforementioned embodiments, the sample buffer is further operable to re-align the sample data set based at least in part on the mis-alignment value of the sample data set. In some cases, the system is implemented as part of an integrated circuit. In various cases, the system is incorporated in a hard disk drive including a storage medium and a read/write head assembly disposed in relation to the storage medium.

In various instances of the aforementioned embodiments, the mis-alignment determination circuit includes: a threshold comparison circuit and a correlation circuit. The threshold comparison circuit operable to compare instances of the interim output with a threshold value to yield a signature where the signature includes a set of reliable correlation bits and corresponding reliable bit positions. The correlation circuit is operable to identify a position in the detected output that exhibits a correlation to the signature. In some cases, the correlation circuit is further operable to calculate the mis-alignment value based upon the identified position in the detected output. In various cases, the interim output includes soft data for bit positions generated as part of applying the data decoding algorithm. In one or more cases, the sample data set is a fragment of a first codeword associated with a parity codeword, and the sample buffer is further operable to store a second codeword associated with the parity codeword, and the parity codeword. In such cases, the interim output can include either parity information generated based at least in part on the parity codeword and the second codeword, or soft data for bit positions generated based at least in part on a combination of the parity codeword and the second codeword.

Other embodiments of the present invention provide methods for data processing. The methods include: storing a sample data set to a storage buffer circuit, where the sample data set is mis-aligned; applying a data detection algorithm to the sample data set to yield a detected output; and applying a data decoding algorithm to a decoder input to yield an interim output, where the decoder input is derived from the detected output. A correlation circuit is used to: generate a correlation value corresponding to a difference between the detected output and a signature, wherein the signature is derived from the interim output; determine a correlation occurrence based at least in part on the correlation value; and determine a mis-alignment value for the correlation occurrence. The methods further include re-aligning the sample data set based at least in part on the mis-alignment value to yield a re-aligned sample data set.

In some instances of the aforementioned embodiments, the methods further include comparing instances of the interim output with a threshold value to yield a signature. In such instances, the signature includes a set of reliable correlation bits and corresponding reliable bit positions. In some such instances, the threshold value is user programmable. In other instances, the threshold value is fixed. In one or more instances of the aforementioned embodiments where the detected output is a first detected output and the decoder input is a first decoder input, the methods may further include: applying the data detection algorithm to the re-aligned sample data set to yield a second detected output; and applying the data decoding algorithm to a second decoder input to yield a decoded output, wherein the second decoder input is derived from the second detected output. In some instances of the aforementioned embodiments, the methods further include applying a sync mark detection to an input data set to identify a sync mark within the input data set, where the sample data set corresponds to the input data set. In such instances, the mis-alignment of the sample data set results from a failure to detect a sync mark within an expected range of elements of the input data set.

In various instances of the aforementioned embodiments the correlation value is a Euclidean distance between the detected output and the signature, and the correlation occurrence occurs at a position where the Euclidean distance is less than a threshold value. In some such instances, the threshold value is user programmable. In other instances, the threshold value is fixed.

Data storage systems often store data arranged in tracks. FIG. 1a shows a storage medium 101 with two exemplary tracks 151, 156 indicated as dashed lines. The tracks are segregated by servo data written within wedges 161, 166 (i.e., servo wedges). These wedges include data and supporting bit patterns 111 that are used for control and synchronization of the read/write head assembly over a desired location on storage medium 101. In particular, these wedges generally include a preamble pattern 192 followed by a sector address mark 194 (SAM). Sector address mark 194 is followed by a Gray code 196, and Gray code 196 is followed by burst information 198. It should be noted that while two tracks and two wedges are shown, hundreds of each would typically be included on a given storage medium. User data is stored at bit period locations between successive servo wedges.

Figure 1B:
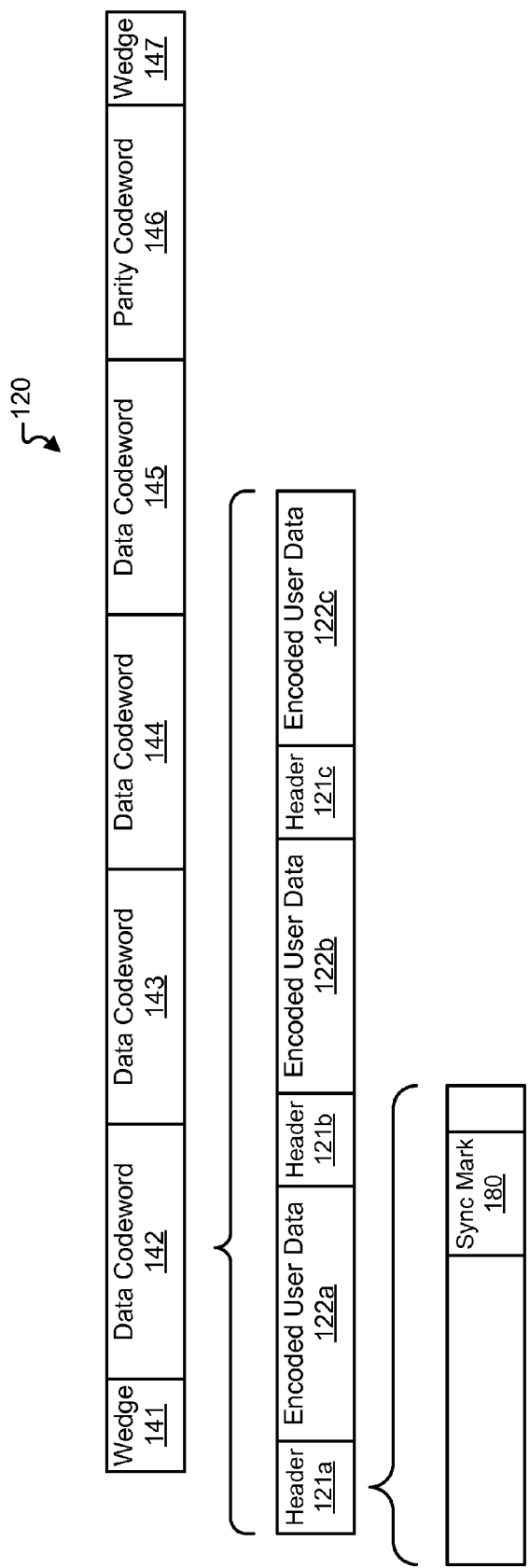

Turning to FIG. 1b, an example user data set 120 stored between the instances of the servo wedges of FIG. 1a (e.g., on track 156 between wedges 161, 166 corresponding to wedges 141, 147). User data set 120 includes a number of data codewords 142, 143, 144, 145 each representing respective sectors of user data, and a parity codeword 146 including parity that corresponds to each of data codewords 142, 143, 144, 145. Parity codeword 146 may be used to implement cross codewords error correction. One example of cross codewords error correction is disclosed in U.S. patent application Ser. No. 14/611,949 entitled "Systems and Methods for Soft Data Based Cross Codeword Error Correction", and filed Feb. 2, 2015 by Han et al. The entirety of the aforementioned reference is incorporated herein by reference for all purposes. It should be noted that while the example shows four codewords protected by one parity codeword.

Each of data codewords 142, 143, 144, 145 include user data augmented by parity data. In some cases, codewords 142, 143, 144, 145 are low density parity check codewords as are known in the art. As shown, each of data codewords 142, 143, 144, 145 (represented by codeword 142) includes a number of fragments of encoded user data 122a, 122b, 122c each preceded by a header 121a, 121b, 121c. Together, all of the fragments of encoded user data 122a, 122b, 122c form a user data codeword (e.g., a low density parity check codeword). Each of headers 121a, 121b, 121c include, inter alia, synchronization data. Such synchronization data may be, for example, a defined pattern commonly referred to as a synchronization mark or sync mark for short. Identification of the sync mark allows for proper alignment with the corresponding fragments of encoded user data 122a, 122b, 122c.

Figure 2:
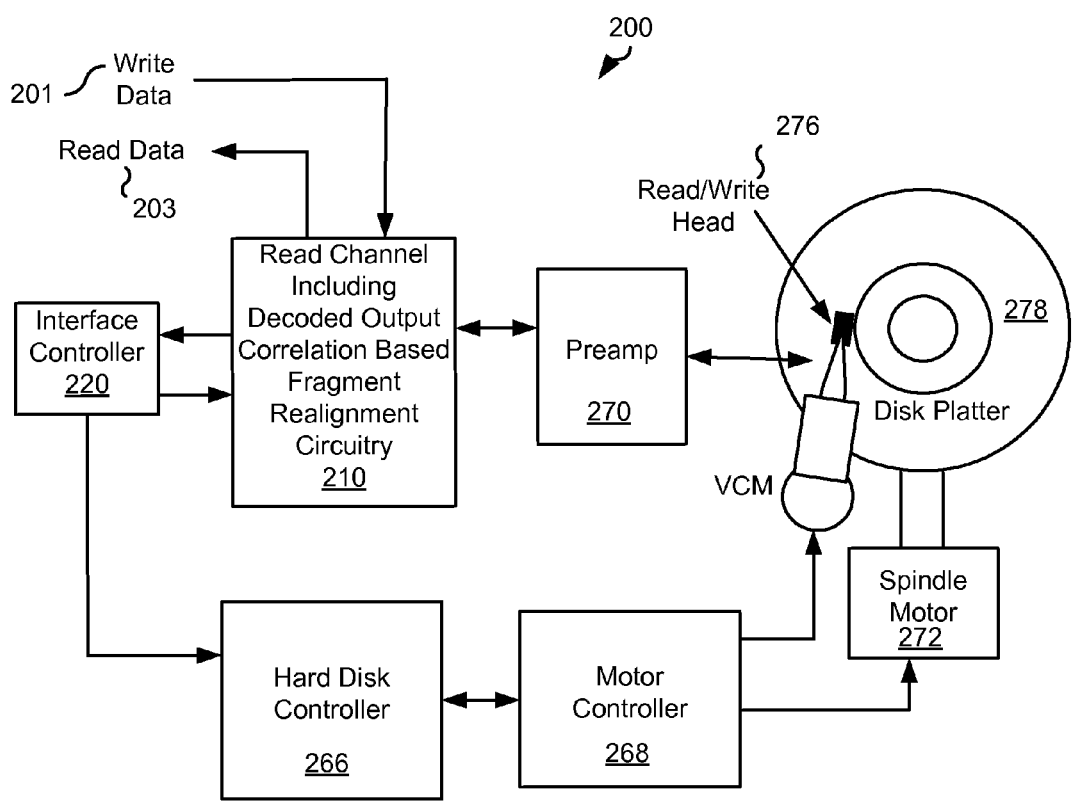
FIG. 2 shows a storage system with a read channel having decoded output correlation based fragment re-alignment circuitry in accordance with various embodiments of the present invention.

Turning to FIG. 2, a storage system 200 with a read channel 210 having decoded output correlation based fragment re-alignment circuitry is shown in accordance with various embodiments of the present invention. Storage system 200 may be, for example, a hard disk drive. Storage system 200 also includes a preamplifier 270, an interface controller 220, a hard disk controller 266, a motor controller 268, a spindle motor 272, a disk platter 278, and a read/write head assembly 276. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head assembly 276 is accurately positioned by motor controller 268 over a desired data track on disk platter 278. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). Once read/write head assembly 278 is positioned adjacent the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel circuit 210 via preamplifier 270. Preamplifier 270 is operable to amplify the minute analog signals accessed from disk platter 278. In turn, read channel circuit 210 decodes and digitizes the received analog signal to recreate the information originally written to disk platter 278. This data is provided as read data 203 to a receiving circuit. A write operation is substantially the opposite of the preceding read operation with write data 201 being provided to read channel circuit 210. This data is then encoded and written to disk platter 278.

During a read operation, data is sensed from disk platter 278 and processed through a data processing circuit including a data detector circuit and a data decoder circuit. This data processing includes synchronization using one or more sync marks distributed throughout the received data. Where a failure to detect a sync mark occurs, correlation based fragment alignment performed by decoded output correlation based fragment alignment circuitry may be used to recover the otherwise mis-aligned data. The data may be processed using circuitry similar to that discussed below in relation to FIGS. 3 and 5, and/or using processes discussed below in relation to FIG. 4a-4b, 6a-6b, or 4a-7b.

It should be noted that storage system 200 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 210 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 200 may be modified to include solid state memory that is used to store data in addition to the storage offered by disk platter 278. This solid state memory may be used in parallel to disk platter 278 to provide additional storage. In such a case, the solid state memory receives and provides information directly to read channel circuit 210. Alternatively, the solid state memory may be used as a cache where it offers faster access time than that offered by disk platted 278. In such a case, the solid state memory may be disposed between interface controller 220 and read channel circuit 210 where it operates as a pass through to disk platter 278 when requested data is not available in the solid state memory or when the solid state memory does not have sufficient storage to hold a newly written data set. Based upon the disclosure provided herein, one of ordinary skill in the art will recognize a variety of storage systems including both disk platter 278 and a solid state memory.

Figure 3:
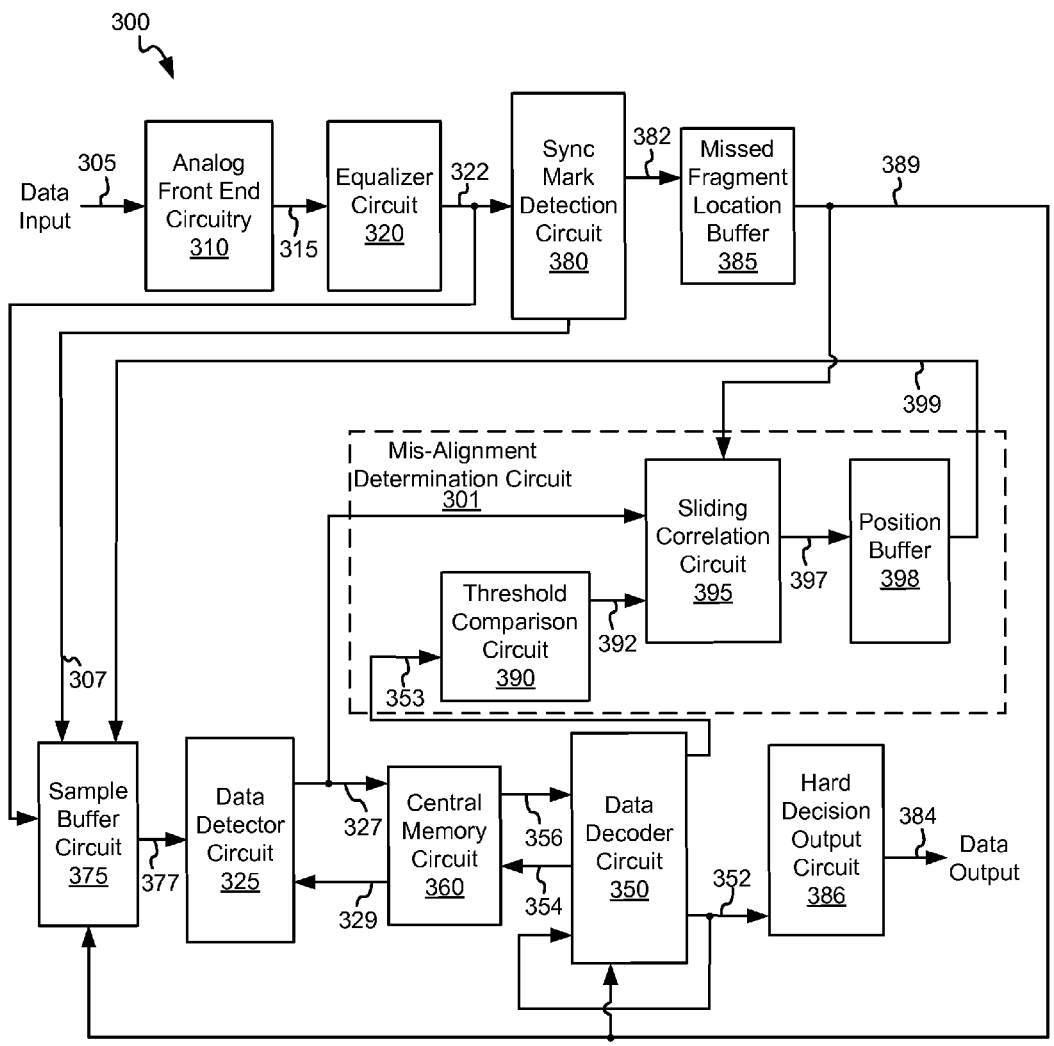
FIG. 3 shows a data processing circuit including decoded output correlation based fragment re-alignment circuitry operating on a single codeword in accordance with various embodiments of the present invention.

Turning to FIG. 3, a data processing circuit 300 including decoded output correlation based fragment re-alignment circuitry operating on a single codeword is shown in accordance with various embodiments of the present invention. Data processing circuit 300 includes an analog front end circuit 310 that receives an analog data input 305. Analog front end circuit 310 processes analog data input 305 and provides a series of digital samples 315 corresponding to the received data input 305. Analog front end circuit 310 may include, but is not limited to, an analog filter, an amplifier circuit, and an analog to digital converter circuit as are known in the art. Based upon the disclosure provided herein, one of ordinary skill in the art will recognize a variety of circuitry that may be included as part of analog front end circuit 310. In some cases, analog data input 305 is derived from a read/write head assembly (not shown) that is disposed in relation to a storage medium (not shown). In other cases, analog data input 305 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog data input 305 may be derived.

Digital samples 315 are provided to an equalizer circuit 320. Equalizer circuit 320 applies an equalization algorithm to digital samples 315 to yield an equalized output 322. In some embodiments of the present invention, equalizer circuit 320 is a digital finite impulse response filter circuit as are known in the art. It may be possible that equalized output 322 may be received directly from a storage device in, for example, a solid state storage system. In such cases, analog front end circuit 310 and equalizer circuit 320 may be eliminated where the data is received as a digital data input. Equalized output 322 is stored to a sample buffer circuit 375 that includes sufficient memory to maintain a number of codewords until processing of the codewords is completed through a data detector circuit 325 and a data decoder circuit 350 including, where warranted, multiple global iterations (passes through both data detector circuit 325 and data decoder circuit 350) and/or local iterations (passes through data decoder circuit 350 during a given global iteration). An output 377 is provided to data detector circuit 325 from sample buffer circuit 375. The equalized output in sample buffer 375 is aligned in fragments (e.g., corresponding to fragments 122a, 122b, 122c) based upon the locations of identified sync marks (as indicated by a sync mark location value 307) or upon an estimated framing location (as indicated by an estimated framing value 389).

In addition, equalized output 322 is provided to a sync mark detection circuit 380. Sync mark detection circuit 380 determines whether the currently received equalized output 322 (i.e., a number of previous instances of equalized output 322 plus the latest instance of equalized output 322) is within a window where a sync mark is expected. Thus, using FIG. 1b as an example, sync mark detection circuit 380 determines whether the currently received equalized output is within a region around which sync mark 180 is to be expected. In some cases, the window may be defined as a region surrounding a location where the next sync mark is expected based upon a distance from a previously identified sync mark or estimated sync mark. Where the currently received equalized output is not within the defined window, sync mark detection circuit 380 disables any assertion of a sync mark found signal to avoid a misdetection condition.

Alternatively, where the currently received equalized output 322 is within the defined window, sync mark detection circuit 380 calculates a Euclidean distance (i.e., performs a Euclidean distance comparison) to determine whether a sync mark is found in the recently received equalized output 322. Where the comparison indicates a Euclidean distance less than a defined threshold, a sync mark is identified and sync mark detection circuit 380 asserts a sync found signal is asserted and sync mark location value 307 is provided. Sync mark location value 307 may be any value known in the art that may be used for aligning equalized output 322 along codeword and/or fragment boundaries. Based upon the disclosure provided herein, one of ordinary skill in the art will recognize other sync mark detection approaches that may be used in relation to different embodiments of the present invention.

Alternatively, where a sync mark is not found within the window, sync mark detection circuit 380 asserts a sync missed signal and provides a estimated framing location 382 to a missed fragment buffer 385. Estimated framing location 382 indicates a location where the sync mark was expected. As an example, where the window where the sync mark is expected to be found corresponds to an expected location of header 121c of FIG. 1b, the estimated framing may indicate the beginning of header 121c or some offset into header 121c. In such a case, the corresponding codeword fragment within the sample buffer will be only approximately aligned using the estimated framing. Missed fragment buffer 385 provides estimated framing value 589 that indicates the location of the fragment where the sync mark was missed.

Data detector circuit 325 may be a single data detector circuit or may be two or more data detector circuits operating in parallel on different codewords. Whether it is a single data detector circuit or a number of data detector circuits operating in parallel, data detector circuit 325 is operable to apply a data detection algorithm to a received codeword or data set. In some embodiments of the present invention, data detector circuit 325 is a Viterbi algorithm data detector circuit as are known in the art. In other embodiments of the present invention, data detector circuit 325 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 325 is used to apply the data detection algorithm to the received codeword for a first global iteration applied to the received codeword, and another data detector circuit included in data detector circuit 325 is operable apply the data detection algorithm to the received codeword guided by a decoded output accessed from a central memory circuit 360 on subsequent global iterations.

Upon completion of application of the data detection algorithm to the received codeword on the first global iteration, data detector circuit 325 provides a detector output 327. Detector output 327 includes soft data. As used herein, the phrase "soft data" is used in its broadest sense to mean reliability data with each instance of the reliability data indicating a likelihood that a corresponding bit location or group of bit locations has been correctly detected. In some embodiments of the present invention, the soft data or reliability data is log likelihood ratio data as is known in the art. Detector output 327 is provided (in some cases after a de-interleaving process) to a central memory circuit 360.

Once data decoder circuit 350 is available, a previously stored detector output is accessed from central memory circuit 360 as a stored codeword 356 (and de-interleaved where necessary). Codeword 356 is provided to data decoder circuit 350. In some embodiments, data decoder circuit 350 is a low density parity check decoder circuit as is known in the art. Data decoder circuit 350 erases elements of codeword 356 received from central memory 360 that correspond to locations indicated by estimated framing value 389 provided from missed fragment location circuit 385. Data decoder circuit 350 applies a data decoding algorithm to the codeword received as codeword 356 to yield an initial decoded output 353. Again, this received codeword includes both non-erased fragments and erased fragments. Such application of the data decoding algorithm results in a modification of elements corresponding to the fragment associated with the estimated framing. These changes are based upon parity data included in the received codeword and the soft data from the fragments not associated with the estimated framing, and are not influenced by any mis-alignment of a fragment associated with the estimated framing as such fragments were previously erased. Said another way, elements of the resulting decoded output provide a rough representation of the data that should have been found in the fragment where the sync mark was missed.

Initial decoded output 353 is provided to a threshold comparison circuit 390 included as part of a mis-alignment determination circuit 301 (shown in dashed lines). Initial decoded output 353 includes soft data values corresponding to each bit position indicating the likelihood that a hard decision value associated with the bit position has been correctly determined. Threshold comparison circuit 390 compares the soft value of each instance of interim decoded output corresponding to the locations in the fragment at the location indicated by estimated framing value 389 with a threshold value. In some cases, the threshold value is user programmable. In other cases, the threshold value is fixed. Where the comparison is below the threshold, the position is excluded from a set of reliable bit positions. Alternatively, where the comparison is equal to or greater than the threshold, the position and the corresponding value is included as a reliable correlation bit in the set of reliable bit positions. The resulting set of reliable bit positions and corresponding reliable correlation bits is provided as a signature 392.

A sliding correlation circuit 395 repeatedly calculates a Euclidean distance between signature 392 and a sliding window of detected output 327 corresponding to estimated framing value 389 (i.e., corresponding to the bit positions of the fragments where the sync mark was missed), and compares the resulting Euclidean distance with a threshold value. It should be noted that other approaches for comparison may be used. For example, a more simplified implementation may use a Hamming distance as is known in the art. Thus, for example, signature 392 may include respective reliable correlation bit values at a position X+1, a position X+3, a position X+34 and a position X+61, where X is the offset into interim decoded output corresponding to the beginning of the fragment associated with estimated framing 389 within sample buffer 375. In such a case, the elements of interim output 353 for these positions are compared across detected output 327 to identify a correlated distribution (i.e., is there a location in the detected output that shows similar signature). Where the Euclidean distance between the signature and detected output 327 is the minimum value within the search window, a match to the signature is indicated at an offset corresponding to the portion of detected output 327 corresponding to the identified minimum distance.

Using the aforementioned offset, sliding correlation circuit 395 calculates a mis-alignment value 397. Thus, using the preceding example, where signature 392 corresponds to position X+1, position X+3, position X+34, and position X+61 and the corresponding position in detected output 327 is a position Y+1, a position Y+3, a position Y+34, and a position Y+61 where Y is the offset into the samples in sample buffer 375, then mis-alignment value 397 is calculated as Y−X (i.e., the offset between the decoded data and the samples in the sample buffer). Mis-alignment value 397 is stored to a position buffer 398, and a corresponding buffered value 399 is provided to sample buffer 375. Using this information, sample buffer 375 re-aligns the samples corresponding to the fragment indicated by estimated framing value 389 to correct the mis-alignment. With this done, estimated framing value 389 is erased in preparation for standard processing.

Where estimated framing value 389 is null (either though correction or where no sync marks are missed), data decoder circuit 350 applies one or more iterations of the data decoding algorithm to codeword 356 to yield a decoded output 371. In cases where another local iteration (i.e., another pass through data decoder circuit 350) is desired (i.e., decoding failed to converge and more local iterations are allowed), data decoder circuit 350 re-applies the data decoding algorithm to codeword 356 guided by decoded output 352. This continues until either a maximum number of local iterations is exceeded or decoded output 352 converges (i.e., completion of standard processing).

Where decoded output 352 fails to converge (i.e., fails to yield the originally written data set) and a number of local iterations through data decoder circuit 350 exceeds a threshold, but an allowable number of global iterations is not yet exceeded, the resulting decoded output is provided as a decoded output 354 back to central memory circuit 360 where it is stored awaiting another global iteration through a data detector circuit included in data detector circuit 325. Prior to storage of decoded output 354 to central memory circuit 360, decoded output 354 may be de-interleaved such that a de-interleaved output is stored to central memory circuit 360. When a data detector circuit included in data detector circuit 325 becomes available, a previously stored decoded output 354 is accessed from central memory circuit 360 and where necessary de-interleaved to yield a detector input 329. Detector input 329 is provided to data detector circuit 325 where it is used to guide subsequent detection of a corresponding data set previously received as equalized output 322.

Alternatively, where decoded output 352 converges (i.e., yields the originally written data set), the resulting decoded output is provided to a hard decision output circuit 386 where it is formatted and provided as a data output 384. As yet another alternative, where decoded output 352 fails to converge (i.e., fails to yield the originally written data set), a number of local iterations through data decoder circuit 350 exceeds a threshold, and a number of global iterations through data detector circuit 325 and data decoder circuit 350 exceeds a threshold, the result of the last pass through data decoder circuit is provided as a decoded output along with an error indicator (not shown).

Figure 4A:
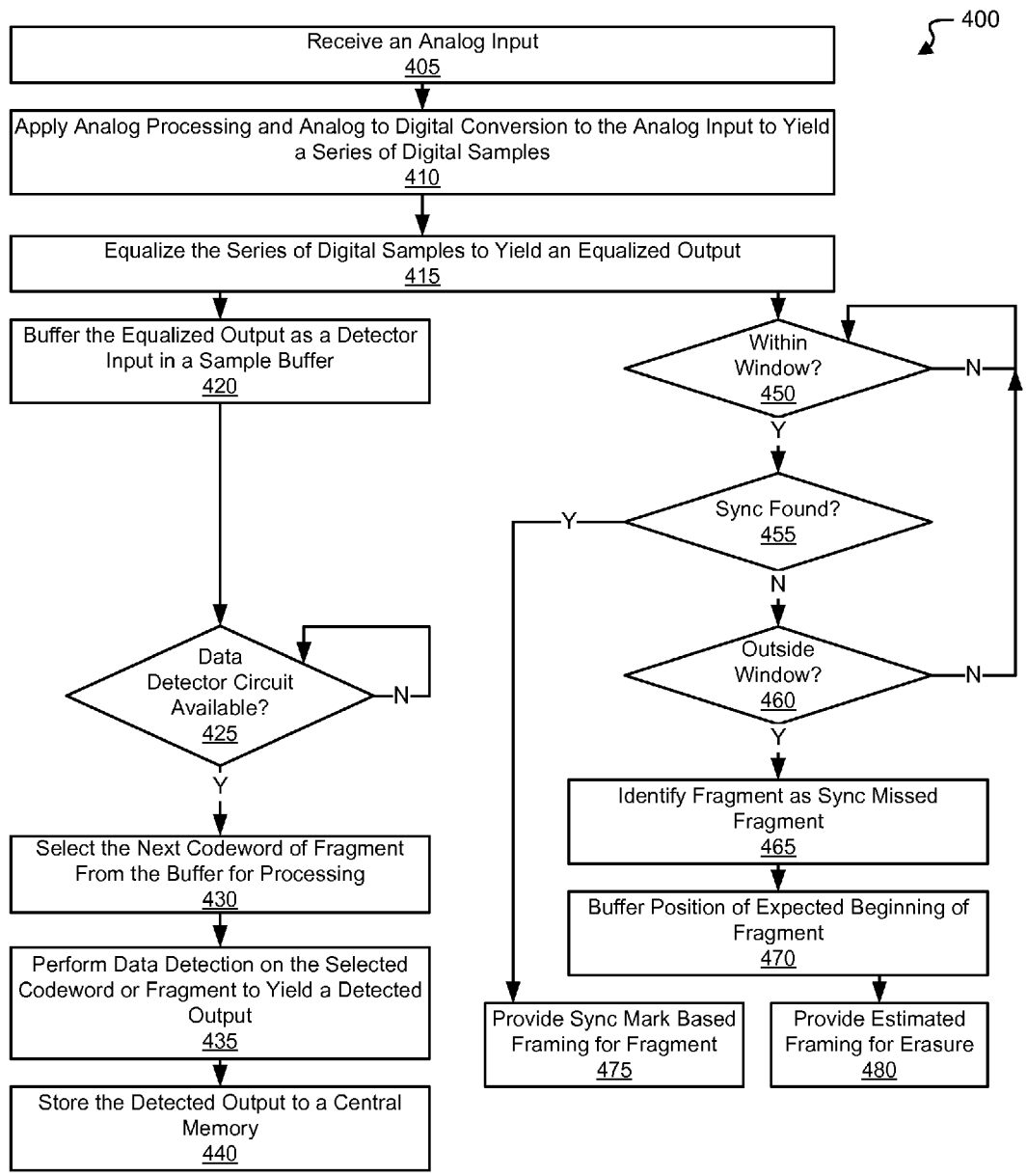
FIGS. 4a-4b are flow diagrams showing a method in accordance with various embodiments of the present invention for re-aligning data using correlation with a decoded output.
Figure 4B:
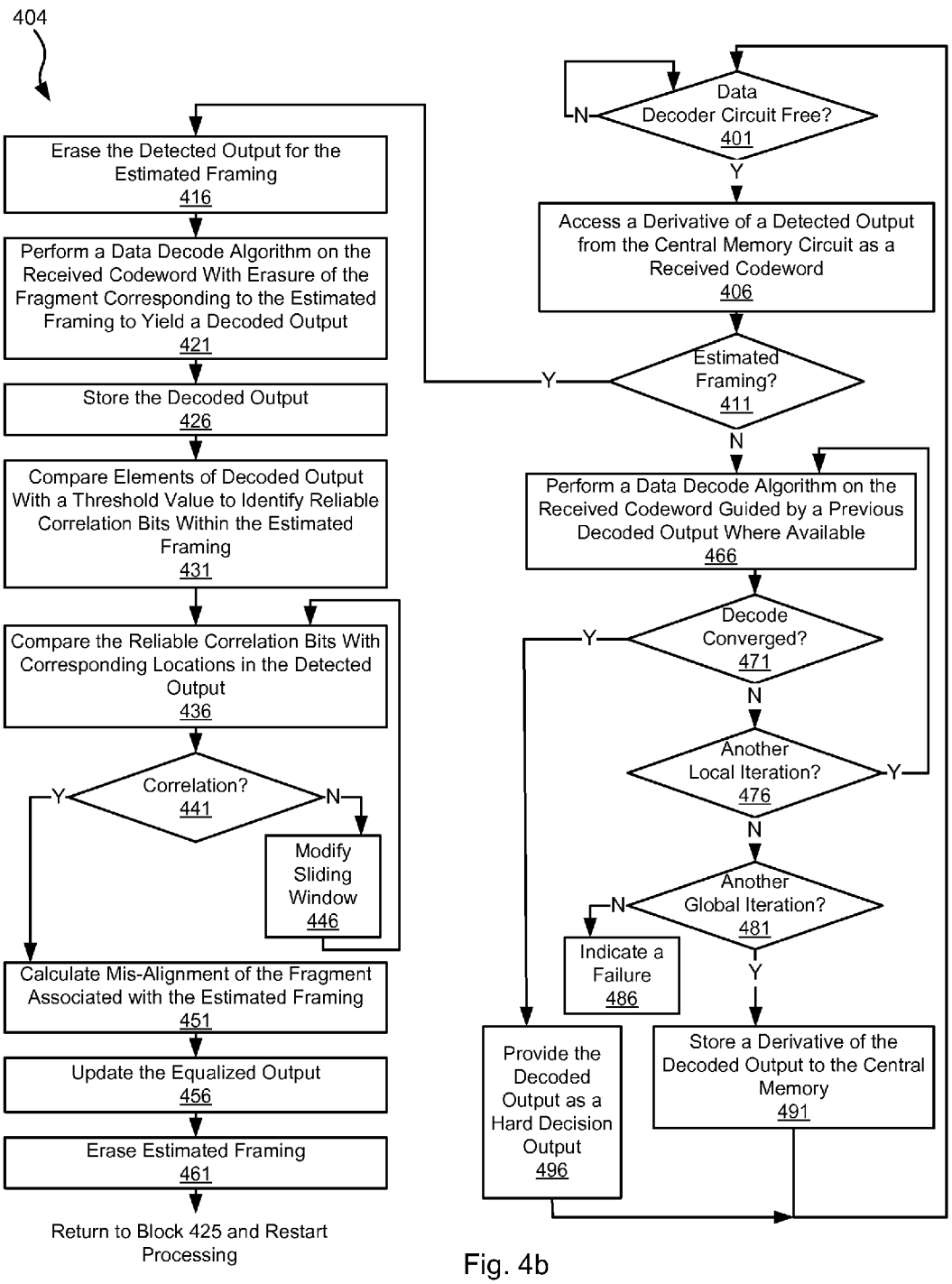

Turning to FIGS. 4a-4b, flow diagrams 400, 404 show a method in accordance with various embodiments of the present invention for re-aligning data using correlation with a decoded output. Following flow diagram 400 of FIG. 4a, an analog input is received (block 405). The analog input may be derived from, for example, a read head flying over a track of a storage medium. Based upon the disclosure provided herein, one of ordinary skill in the art will recognize a variety of sources of the analog input. Analog processing is applied to the analog input to yield a processed analog input, and the processed analog input is converted to a series of digital samples (block 410). The analog processing may include, but is not limited to, analog filtering and/or amplification. The analog to digital conversion may be done using an analog to digital converter circuit or system as are known in the art. Of note, any circuit known in the art that is capable of converting an analog signal into a series of digital values representing the received analog signal may be used.

The series of digital samples are equalized to yield an equalized output (block 415). In some cases, the aforementioned equalization may be done using a digital finite impulse response equalizer circuit as are known in the art, however, other approaches to equalization may be used in relation to different embodiments of the present invention. The resulting equalized output is buffered as a detector input in a sample buffer (block 420). The data within the sample buffer is aligned in fragments (e.g., corresponding to fragments 122a, 122b, 122c) based upon the locations of identified sync marks (see block 475 below) or an estimated framing where a sync mark is not found (see block 480 below).

In addition, it is determined whether the currently received equalized output is within a window where a sync mark is expected (block 450). Thus, using FIG. 1b as an example, it may be determined whether the currently received equalized output is within a region around which sync mark 180 is to be expected. In some cases, the window may be defined as a region surrounding a location where the next sync mark is expected based upon a distance from a previously identified sync mark or estimated sync mark. Where the currently received equalized output is not within the defined window (block 450), sync mark detection is not performed. Alternatively, where the currently received equalized output is within the defined window (block 450), sync mark detection is performed to determine whether a sync mark is found in the recently received equalized output (block 445). Such sync mark detection may employ any method known in the art for identifying a sync mark within a data set. In one particular embodiment, a defined sync mark pattern is compared with a sliding series of instances of equalized output. Where the comparison indicates a Euclidean distance less than a defined threshold, a sync mark is identified (i.e., a sync is found)(block 455). Alternatively, a sync mark is not identified (block 455).

Where a sync is found (block 455), a sync mark found signal is asserted and the location at which the sync mark is found is used to align data along fragment and/or codeword boundaries in the sample buffer (block 475). Alternatively, where a sync is not found (block 455), it is determined whether the next equalized output will be outside of the window (block 460). Where the next equalized output will not be outside the window (block 460), the processes of blocks 450-460 are repeated for the next equalized output. Otherwise, where the next equalized output will be outside the window (block 460), the sync mark has been missed. In such a condition, the fragment corresponding to the missed sync mark is identified as a sync missed fragment (block 465) and a position where the sync mark was expected is buffered as an estimated framing (block 480). As an example, where the window where the sync mark is expected to be found corresponds to an expected location of header 121*c* of FIG. 1*b*, the estimated framing may indicate the beginning of header 121*c* or some offset into header 121*c*. In such a case, the corresponding codeword fragment within the sample buffer will be only approximately aligned using the estimated framing.

It is determined whether a data detector circuit is available (block 425). Where the data detector circuit is available (block 425), the next codeword or fragment (i.e., a portion of the equalized output aligned using either the estimated framing or sync mark) from the sample buffer is selected for processing (block 430), and a data detection is performed on the selected codeword or fragment to yield a detected output (block 435). The data detection may be, but is not limited to, a Viterbi algorithm data detection or a maximum a posteriori data detection. Based upon the disclosure provided herein, one of ordinary skill in the art will recognize other data detection algorithms that may be used in relation to different embodiments of the present invention. The detected output is then stored to a central memory where it awaits the availability of a downstream data decoder circuit (block 440).

Turning to FIG. 4*b* and following flow diagram 404, in parallel to the previously described data detection process, it is determined whether a data decoder circuit is available (block 401). The data decoder circuit may be, for example, a low density data decoder circuit as are known in the art. Where the data decoder circuit is available (block 401), a previously stored derivative of a detected output is accessed from the central memory and used as a received codeword (block 406). It is determined whether estimated framing is indicated for one or more fragments (e.g., fragments 122*a*, 122*b*, 122*c*) of the received codeword (block 411). Estimated framing indicates that a sync mark for a fragment was missed and that the alignment of data within a sample buffer is just approximated based upon an expected sync mark location.

Where estimated framing is not indicated for any of the fragments of the received codeword (block 411), a data decode algorithm is applied to the received codeword to yield a decoded output (block 466). It is then determined whether the decoded output converged (e.g., resulted in the originally written data as indicated by the lack of remaining unsatisfied checks) (block 471). Where the decoded output converged (block 471), the converged codeword is converted and provided as a hard decision output (block 496).

Alternatively, where the decoded output failed to converge (e.g., errors remain) (block 471), it is determined whether another local iteration is desired (block 476). In some cases, as a default seven local iterations are allowed per each global iteration. Based upon the disclosure provided herein, one of ordinary skill in the art will recognize another default number of local iterations that may be used in relation to different embodiments of the present invention. Where another local iteration is desired (block 476), the data decode algorithm is re-applied using the current decoded output as a guide (block 466).

Alternatively, where another local iteration is not desired (block 476), it is determined whether another global iteration is allowed (block 481). As a default, another global iteration is allowed where there is sufficient available space in the central memory and an output memory reordering queue to allow another pass through processing the currently processing codeword. Where another global iteration is allowed (block 481), a derivative of the decoded output is stored to the central memory (block 491). The process of data detection beginning at block 435 of FIG. 4*a* may then be re-applied to the decoded output. Alternatively, where another global iteration is not allowed (block 481), a failure to converge is indicated (block 486), and the current decoded output is provided.

Alternatively, where estimated framing is indicated for any of the fragments of the received codeword (block 411), a re-alignment of the data within the sample buffer is performed using a comparison of the detected output for a particular codeword associated with the estimated framing and a decoded output. This process includes erasing a portion of the detected output corresponding to the fragment where the sync mark was missed (block 416). The aforementioned erasure may include, but is not limited to, setting the corresponding soft information in the detected output to a value indicating a high improbability that the elements are correct. This assures maximum freedom in changing the elements when a data decoding algorithm is applied. Thus, for example, where the received codeword corresponds to data codeword 142 and encoded user data 122*b* is associated with the estimated framing, then elements within the detected output corresponding to encoded user data 122*b* are erased. Notably, elements within the detected output corresponding to encoded user data 122*a* and encoded user data 122*c* are not erased.

The data decoding algorithm is applied to the received codeword including both erased fragments and non-erased fragments to yield a decoded output (block 421). Such application of the data decoding algorithm results in a modification of elements corresponding to the fragment associated with the estimated framing. These changes are based upon parity data included in the received codeword and the soft data from the fragments not associated with the estimated framing, and are not influenced by any misalignment of a fragment associated with the estimated framing as such fragments were previously erased. Said another way, elements of the resulting decoded output provide a rough representation of the data that should have been found in the fragment where the sync mark was missed.

The soft data of elements of the resulting decoded output corresponding to the fragment where the sync mark was missed are each compared with a threshold value to identify reliable correlation bits (block 431). Thus, for example where a log likelihood ratio of a particular element in the decoded output is below a threshold (i.e., is less likely to be correct), it is excluded from a set of reliable bit positions where reliable correlation bits are found. Alternatively, where a log likelihood ratio of a particular element in the decoded output is equal to or above a threshold (i.e., is more likely to be correct), it is included in the set of reliable bit positions where reliable correlation bits are found.

The aforementioned reliable correlation bits are compared with bit values distributed correspondingly within the detected output to find a location of correlation (block 436). Thus, for example, the set of reliable bit positions may include a position X+1, a position X+3, a position X+34 and a position X+61 where X is the offset into the decoded output corresponding to the beginning of the fragment associated with the estimated framing within the sample buffer. In such a case, the elements of the decoded output for these positions are compared across the detected output to identify a correlated distribution (i.e., is there a location in the detected output that shows similar reliable correlation bits at a spacing that is the same as the reliable bit positions). This process of comparison may be done by comparing the reliable correlation bits distributed as set forth in the set of reliable bit positions with a sliding window of the detected output.

It is determined whether a correlation is found (block 441). Where the aforementioned comparison process includes calculating a Euclidean distance, then determination of whether a correlation is found includes comparing the Euclidean distance with a threshold. Where a correlation is not found (block 441), the window of comparison within the detected output is modified or slid (block 446) and the process of comparing is performed anew using the new window of the detected output (block 436). Alternatively, where a correlation is found (block 441), a mis-alignment value is calculated for the fragment associated with the estimated framing (block 451). Thus, using the preceding example, where the reliable correlation bits correspond to the following positions: position Y+1, a position Y+3, a position Y+34 and a position Y+61, where Y is the offset into the codeword in the sample buffer, then the mis-alignment is calculated as Y−X (i.e., the offset between the decoded data and the samples in the sample buffer). The equalized output stored in the sample buffer is then updated by aligning the fragment associated with the estimated framing to reflect the calculated mis-alignment value (block 456), and the estimated framing associated with the fragment is erased as it has been corrected (block 461). With this re-alignment completed, the processing of the codeword is re-started by re-applying the data detection algorithm of block 425 of FIG. 4a.

Figure 5:
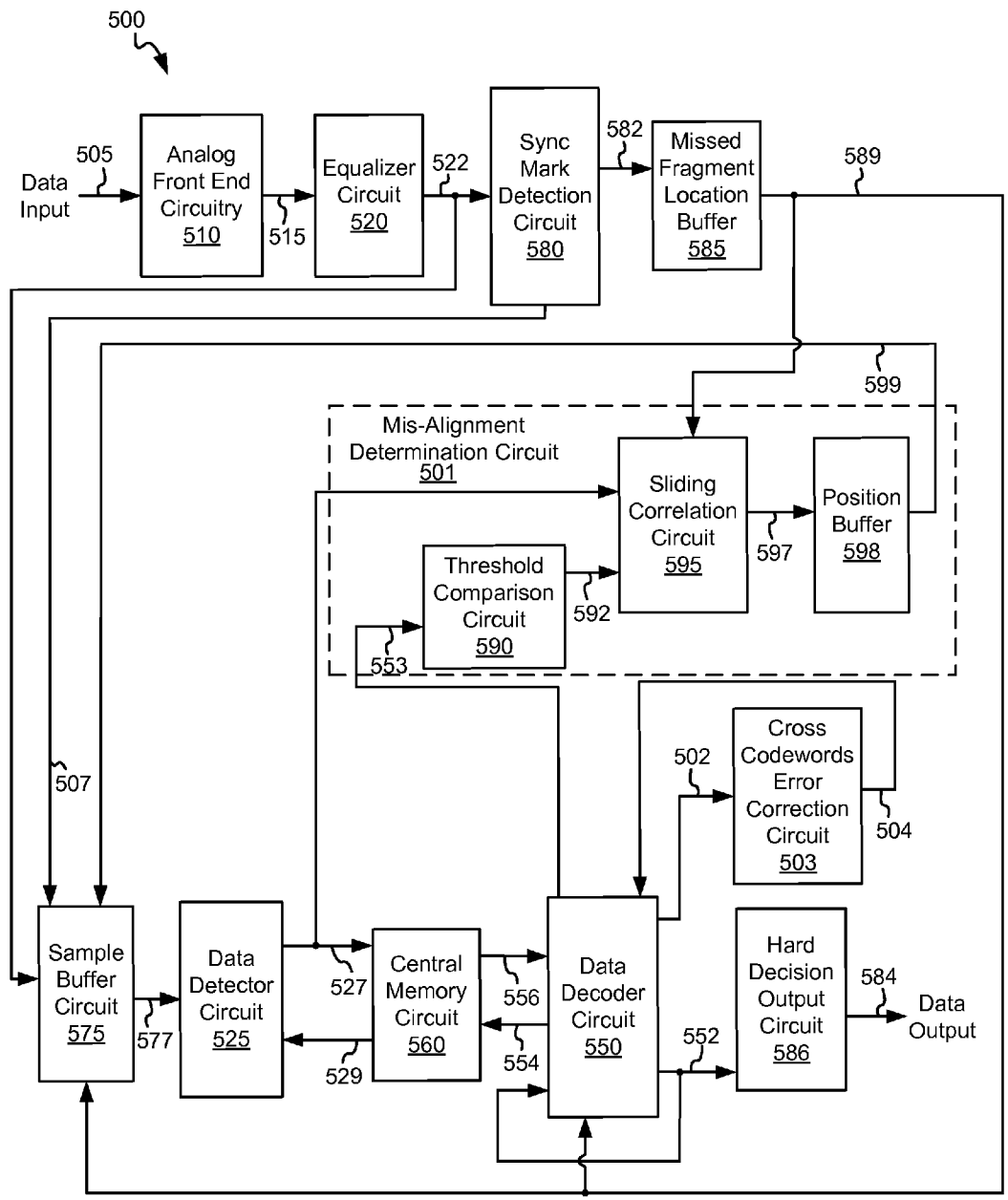
FIG. 5 shows another data processing circuit including decoded output correlation based fragment re-alignment circuitry operating on multiple codewords using cross codewords error correction in accordance with some embodiments of the present invention.

Turning to FIG. 5, a data processing circuit 500 including decoded output correlation based fragment re-alignment circuitry operating on multiple codewords is shown in accordance with some embodiments of the present invention. Data processing circuit 500 includes an analog front end circuit 510 that receives an analog data input 505. Analog front end circuit 510 processes analog data input 505 and provides a series of digital samples 515 corresponding to the received data input 505. Analog front end circuit 510 may include, but is not limited to, an analog filter, an amplifier circuit, and an analog to digital converter circuit as are known in the art. Based upon the disclosure provided herein, one of ordinary skill in the art will recognize a variety of circuitry that may be included as part of analog front end circuit 510. In some cases, analog data input 505 is derived from a read/write head assembly (not shown) that is disposed in relation to a storage medium (not shown). In other cases, analog data input 505 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog data input 505 may be derived.

Digital samples 515 are provided to an equalizer circuit 520. Equalizer circuit 520 applies an equalization algorithm to digital samples 515 to yield an equalized output 522. In some embodiments of the present invention, equalizer circuit 520 is a digital finite impulse response filter circuit as are known in the art. It may be possible that equalized output 522 may be received directly from a storage device in, for example, a solid state storage system. In such cases, analog front end circuit 510 and equalizer circuit 520 may be eliminated where the data is received as a digital data input. Equalized output 522 is stored to a sample buffer circuit 575 that includes sufficient memory to maintain a number of codewords until processing of the codewords is completed through a data detector circuit 525 and a data decoder circuit 550 including, where warranted, multiple global iterations (passes through both data detector circuit 525 and data decoder circuit 550) and/or local iterations (passes through data decoder circuit 550 during a given global iteration). An output 577 is provided to data detector circuit 525 from sample buffer circuit 575. The equalized output in sample buffer 575 is aligned in fragments (e.g., corresponding to fragments 122a, 122b, 122c) based upon the locations of identified sync marks (as indicated by a sync mark location value 507) or upon an estimated framing location (as indicated by an estimated framing value 589).

In addition, equalized output 522 is provided to a sync mark detection circuit 580. Sync mark detection circuit 580 determines whether the currently received equalized output 522 (i.e., a number of previous instances of equalized output 522 plus the latest instance of equalized output 522) is within a window where a sync mark is expected. Thus, using FIG. 1b as an example, sync mark detection circuit 580 determines whether the currently received equalized output is within a region around which sync mark 180 is to be expected. In some cases, the window may be defined as a region surrounding a location where the next sync mark is expected based upon a distance from a previously identified sync mark or estimated sync mark. Where the currently received equalized output is not within the defined window, sync mark detection circuit 580 disables any assertion of a sync mark found signal to avoid a misdetection condition. Alternatively, where the currently received equalized output 522 is within the defined window, sync mark detection circuit 580 calculates a Euclidean distance (i.e., performs a Euclidean distance comparison) to determine whether a sync mark is found in the recently received equalized output 522. Where the comparison indicates a Euclidean distance less than a defined threshold, a sync mark is identified and sync mark detection circuit 580 asserts a sync found signal is asserted and sync mark location value 507 is provided. Sync mark location value 507 may be any value known in the art that may be used for aligning equalized output 522 along codeword and/or fragment boundaries. Based upon the disclosure provided herein, one of ordinary skill in the art will recognize other sync mark detection approaches that may be used in relation to different embodiments of the present invention.

Alternatively, where a sync mark is not found within the window, sync mark detection circuit 580 asserts a sync missed signal and provides a estimated framing location 582 to a missed fragment buffer 585. Estimated framing location 582 indicates a location where the sync mark was expected. As an example, where the window where the sync mark is expected to be found corresponds to an expected location of header 121c of FIG. 1b, the estimated framing may indicate the beginning of header 121c or some offset into header 121c. In such a case, the corresponding codeword fragment within the sample buffer will be only approximately aligned using the estimated framing. Missed fragment buffer 585 provides estimated framing value 589 that indicates the location of the fragment where the sync mark was missed.

Data detector circuit 525 may be a single data detector circuit or may be two or more data detector circuits operating in parallel on different codewords. Whether it is a single data detector circuit or a number of data detector circuits operating in parallel, data detector circuit 525 is operable to apply a data detection algorithm to a received codeword or data set. In some embodiments of the present invention, data detector circuit 525 is a Viterbi algorithm data detector circuit as are known in the art. In other embodiments of the present invention, data detector circuit 525 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 525 is used to apply the data detection algorithm to the received codeword for a first global iteration applied to the received codeword, and another data detector circuit included in data detector circuit 525 is operable apply the data detection algorithm to the received codeword guided by a decoded output accessed from a central memory circuit 560 on subsequent global iterations.

Upon completion of application of the data detection algorithm to the received codeword on the first global iteration, data detector circuit 525 provides a detector output 527. Detector output 527 includes soft data. Detector output 527 is provided (in some cases after a de-interleaving process) to a central memory circuit 560.

Once data decoder circuit 550 is available, a previously stored detector output is accessed from central memory circuit 560 as a stored codeword 556 (and de-interleaved where necessary). Codeword 556 is provided to data decoder circuit 550. In some embodiments, data decoder circuit 550 is a low density parity check decoder circuit as is known in the art. Data decoder circuit 550 erases elements of codeword 556 received from central memory 560 that correspond to locations indicated by estimated framing value 589 provided from missed fragment location circuit 585. Data decoder circuit 550 applies a data decoding algorithm to the codeword received as codeword 556 to yield an initial decoded output 553. Such application of the data decoding algorithm includes application of cross codewords error correction by a cross codewords error correction circuit 503 to correct one or more elements of the decoded output based upon a parity codeword and other converged codewords as more fully discussed below. Again, this received codeword includes both non-erased fragments and erased fragments. Such application of the data decoding algorithm results in a modification of elements corresponding to the fragment associated with the estimated framing. These changes are based upon parity data included in the received codeword and the soft data from the fragments not associated with the estimated framing, and are not influenced by any mis-alignment of a fragment associated with the estimated framing as such fragments were previously erased. Said another way, elements of the resulting decoded output provide a rough representation of the data that should have been found in the fragment where the sync mark was missed.

Initial decoded output 553 is provided to a threshold comparison circuit 590 included as part of a mis-alignment determination circuit 501 (shown in dashed lines). Initial decoded output 553 includes soft data values corresponding to each bit position indicating the likelihood that a hard decision value associated with the bit position has been correctly determined. Threshold comparison circuit 590 compares the soft value of each instance of interim decoded output corresponding to the locations in the fragment at the location indicated by estimated framing value 589 with a threshold value. In some cases, the threshold value is user programmable. In other cases, the threshold value is fixed. Where the comparison is below the threshold, the position is excluded from a set of reliable bit positions. Alternatively, where the comparison is equal to or greater than the threshold, the position and the corresponding value is included as a reliable correlation bit in the set of reliable bit positions. The resulting set of reliable bit positions and corresponding reliable correlation bits is provided as a signature 592.

A sliding correlation circuit 595 repeatedly calculates a Euclidean distance between signature 592 and a sliding window of detected output 527 corresponding to estimated framing value 589 (i.e., corresponding to the bit positions of the fragments where the sync mark was missed), and compares the resulting Euclidean distance with a threshold value. Thus, for example, signature 592 may include respective reliable correlation bit values at a position X+1, a position X+3, a position X+34 and a position X+61, where X is the offset into interim decoded output corresponding to the beginning of the fragment associated with estimated framing 589 within sample buffer 575. In such a case, the elements of interim output 553 for these positions are compared across detected output 527 to identify a correlated distribution (i.e., is there a location in the detected output that shows similar signature). Where the Euclidean distance between the signature and detected output 527 is the minimum value within the search window, a match to the signature is indicated at an offset corresponding to the portion of detected output 327 corresponding to the identified minimum distance.

Using the aforementioned offset, sliding correlation circuit 595 calculates a mis-alignment value 597. Thus, using the preceding example, where signature 592 corresponds to position X+1, position X+3, position X+34, and position X+61 and the corresponding position in detected output 527 is a position Y+1, a position Y+3, a position Y+34, and a position Y+61 where Y is the offset into the samples in sample buffer 575, then mis-alignment value 597 is calculated as Y−X (i.e., the offset between the decoded data and the samples in the sample buffer). Mis-alignment value 597 is stored to a position buffer 598, and a corresponding buffered value 599 is provided to sample buffer 575. Using this information, sample buffer 575 re-aligns the samples corresponding to the fragment indicated by estimated framing value 589 to correct the mis-alignment. With this done, estimated framing value 589 is erased in preparation for standard processing.

The aforementioned process of alignment is repeated for each codeword associated with the parity codeword used in cross codewords error correction to obtain alignment information to the respective codeword. Once all codewords associated with missed sync marks are re-aligned in sample buffer 575, all instances of estimated framing value 589 are nullified. With the alignment thus complete, data decoder circuit 550 applies one or more iterations of the data decoding algorithm to codeword 556 to yield a decoded output 571. In cases where another local iteration (i.e., another pass through data decoder circuit 550) is desired (i.e., decoding failed to converge and more local iterations are allowed), data decoder circuit 550 re-applies the data decoding algorithm to codeword 556 guided by decoded output 552. This continues until either a maximum number of local iterations is exceeded or decoded output 552 converges (i.e., completion of standard processing).

Where decoded output 552 fails to converge (i.e., fails to yield the originally written data set) and a number of local iterations through data decoder circuit 550 exceeds a threshold, a converged syndrome value 504 from a cross codewords error correction circuit 503 is used to correct any remaining errors. The cross codewords error correction circuit 503 uses a parity codeword (e.g., parity codeword) that includes parity based upon a number of codewords including the codeword that failed to converge. Where one or more of the other codewords converged, the resulting converged codewords plus the parity from the parity codeword can be used to correct errors remaining in the non-converged codewords. Any approach known in the art for using cross codewords parity to correct errors in a non-converging codeword may be used in relation to different embodiments of the present invention. One example of cross codewords error correction is disclosed in U.S. patent application Ser. No. 14/611,949 entitled "Systems and Methods for Soft Data Based Cross Codeword Error Correction", and filed Feb. 2, 2015 by Han et al. Where after cross codewords error correction decoded output 552 still fails to converge but an allowable number of global iterations is not yet exceeded, the resulting decoded output is provided as a decoded output 554 back to central memory circuit 560 where it is stored awaiting another global iteration through a data detector circuit included in data detector circuit 525. Prior to storage of decoded output 554 to central memory circuit 560, decoded output 554 may be de-interleaved such that a de-interleaved output is stored to central memory circuit 560. When a data detector circuit included in data detector circuit 525 becomes available, a previously stored decoded output 554 is accessed from central memory circuit 560 and where necessary de-interleaved to yield a detector input 529. Detector input 529 is provided to data detector circuit 525 where it is used to guide subsequent detection of a corresponding data set previously received as equalized output 522.

Alternatively, where decoded output 552 converges (i.e., yields the originally written data set), the resulting decoded output is provided to a hard decision output circuit 586 where it is formatted and provided as a data output 584. In addition, a decoded output 502 corresponding to decoded output 552 is provided to cross codewords error correction circuit 503 that updates a converged syndrome value 504 to reflect the converged codeword 552. As yet another alternative, where decoded output 552 fails to converge (i.e., fails to yield the originally written data set), a number of local iterations through data decoder circuit 550 exceeds a threshold, cross codewords error correction fails to correct any remaining errors, and a number of global iterations through data detector circuit 525 and data decoder circuit 550 exceeds a threshold, the result of the last pass through data decoder circuit is provided as a decoded output along with an error indicator (not shown).

Figure 6A:
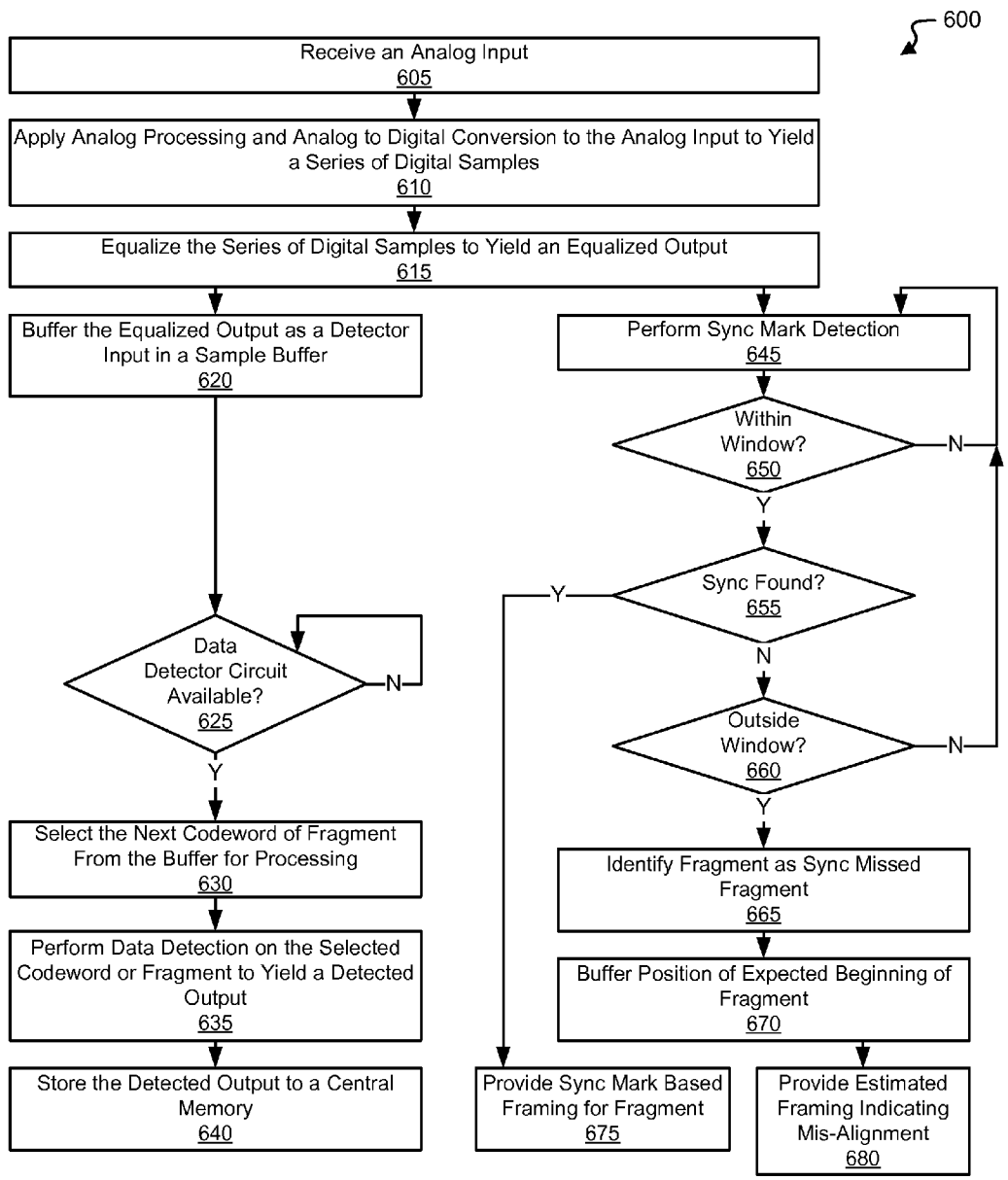
FIGS. 6a-6b are flow diagrams showing a method in accordance with various embodiments of the present invention for re-aligning data using correlation with cross codewords error correction data.
Figure 6B:
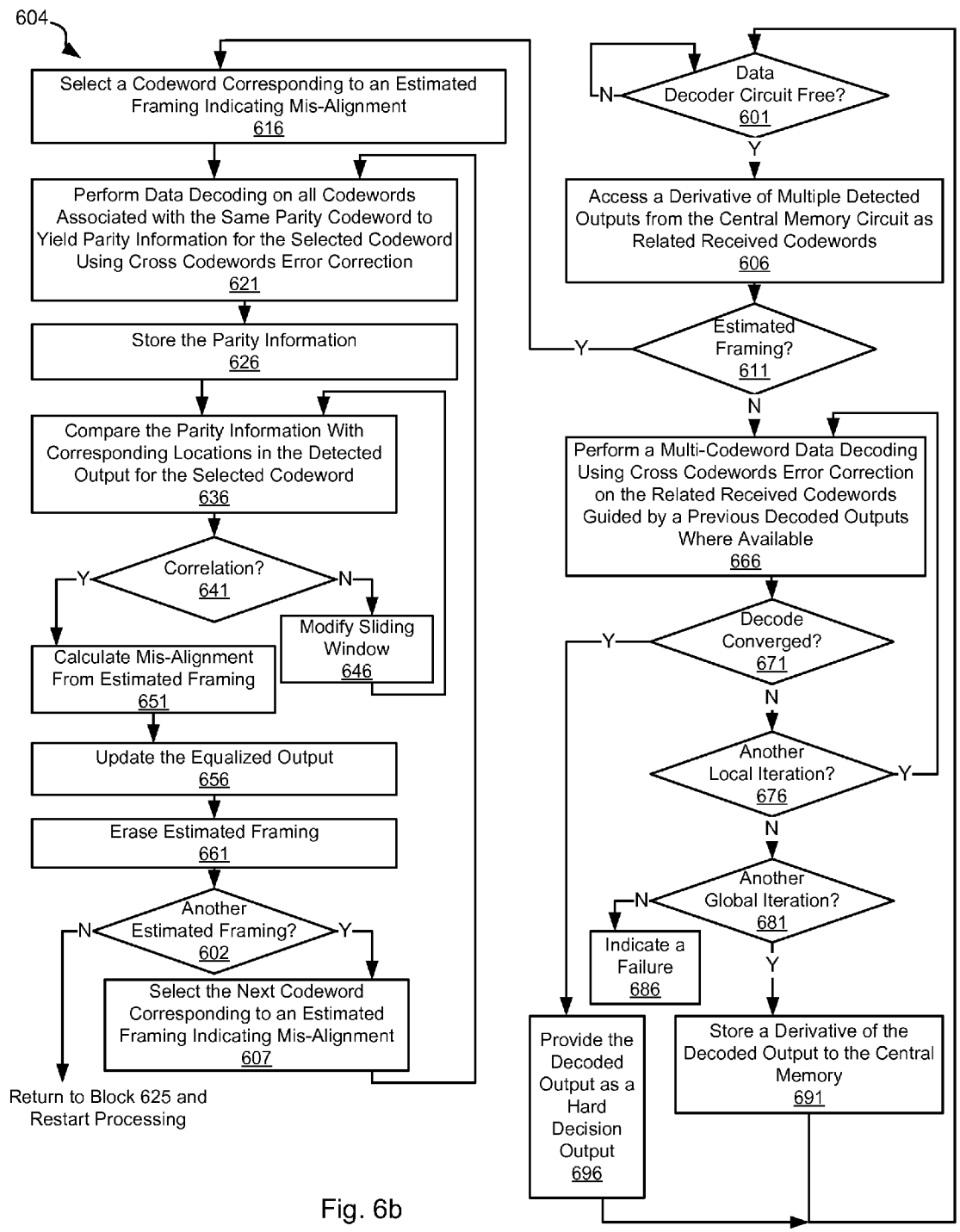

Turning to FIGS. 6a-6b, flow diagrams 600, 604 show a method in accordance with various embodiments of the present invention for re-aligning data using correlation based fragment re-alignment circuitry operating on multiple codewords using cross codewords error. Following flow diagram 600 of FIG. 6a, an analog input is received (block 605). The analog input may be derived from, for example, a read head flying over a track of a storage medium. Based upon the disclosure provided herein, one of ordinary skill in the art will recognize a variety of sources of the analog input. Analog processing is applied to the analog input to yield a processed analog input, and the processed analog input is converted to a series of digital samples (block 610). The analog processing may include, but is not limited to, analog filtering and/or amplification. The analog to digital conversion may be done using an analog to digital converter circuit or system as are known in the art. Of note, any circuit known in the art that is capable of converting an analog signal into a series of digital values representing the received analog signal may be used.

The series of digital samples are equalized to yield an equalized output (block 615). In some cases, the aforementioned equalization may be done using a digital finite impulse response equalizer circuit as are known in the art, however, other approaches to equalization may be used in relation to different embodiments of the present invention. The resulting equalized output is buffered as a detector input in a sample buffer (block 620). The data within the sample buffer is aligned in fragments (e.g., corresponding to fragments 122a, 122b, 122c) based upon the locations of identified sync marks (see block 675 below) or an estimated framing where a sync mark is not found (see block 680 below).

In addition, it is determined whether the currently received equalized output is within a window where a sync mark is expected (block 650). Thus, using FIG. 1b as an example, it may be determined whether the currently received equalized output is within a region around which sync mark 180 is to be expected. In some cases, the window may be defined as a region surrounding a location where the next sync mark is expected based upon a distance from a previously identified sync mark or estimated sync mark. Where the currently received equalized output is not within the defined window (block 650), sync mark detection is not performed. Alternatively, where the currently received equalized output is within the defined window (block 650), sync mark detection is performed to determine whether a sync mark is found in the recently received equalized output (block 645). Such sync mark detection may employ any method known in the art for identifying a sync mark within a data set. In one particular embodiment, a defined sync mark pattern is compared with a sliding series of instances of equalized output. Where the comparison indicates a Euclidean distance less than a defined threshold, a sync mark is identified (i.e., a sync is found)(block 655). Alternatively, a sync mark is not identified (block 655).

Where a sync is found (block 655), a sync mark found signal is asserted and the location at which the sync mark is found is used to align data along fragment and/or codeword boundaries in the sample buffer (block 675). Alternatively, where a sync is not found (block 655), it is determined whether the next equalized output will be outside of the window (block 660). Where the next equalized output will not be outside the window (block 660), the processes of blocks 650-460 are repeated for the next equalized output. Otherwise, where the next equalized output will be outside the window (block 660), the sync mark has been missed. In such a condition, the fragment corresponding to the missed sync mark is identified as a sync missed fragment (block 665) and a position where the sync mark was expected is buffered as an estimated framing (block 680). As an example, where the window where the sync mark is expected to be found corresponds to an expected location of header 121c of FIG. 1b, the estimated framing may indicate the beginning of header 121c or some offset into header 121c. In such a case, the corresponding codeword fragment within the sample buffer will be only approximately aligned using the estimated framing.

It is determined whether a data detector circuit is available (block 625). Where the data detector circuit is available (block 625), the next codeword or fragment (i.e., a portion of the equalized output aligned using either the estimated framing or sync mark) from the sample buffer is selected for processing (block 630), and a data detection is performed on the selected codeword or fragment to yield a detected output (block 635). The data detection may be, but is not limited to, a Viterbi algorithm data detection or a maximum a posteriori data detection. Based upon the disclosure provided herein, one of ordinary skill in the art will recognize other data detection algorithms that may be used in relation to different embodiments of the present invention. The detected output is then stored to a central memory where it awaits the availability of a downstream data decoder circuit (block 640).

Turning to FIG. 6b and following flow diagram 604, in parallel to the previously described data detection process, it is determined whether a data decoder circuit is available (block 601). The data decoder circuit may be, for example, a low density data decoder circuit as are known in the art. Where the data decoder circuit is available (block 601), a previously stored derivative of a detected output is accessed from the central memory and used as a received codeword (block 606). It is determined whether estimated framing is indicated for one or more fragments (e.g., fragments 122a, 122b, 122c) of the received codeword (block 611). Estimated framing indicates that a sync mark for a fragment was missed and that the alignment of data within a sample buffer is just approximated based upon an expected sync mark location.

Where estimated framing is not indicated for any of the fragments of the received codeword (block 611), a multi-codeword data decode algorithm is applied to the received codeword to yield a decoded output (block 666). Such a multi-codeword data decoding algorithm applies a standard data decoding algorithm to individual codewords including both data codewords and a parity codeword, and uses any converged codewords along with the parity codeword to correct any remaining errors in one or more non-converging codewords where possible. It is then determined whether the decoded output converged (e.g., resulted in the originally written data as indicated by the lack of remaining unsatisfied checks) (block 671). Where the decoded output converged (block 671), the converged codeword is converted and provided as a hard decision output (block 696).

Alternatively, where the decoded output failed to converge (e.g., errors remain) (block 671), it is determined whether another local iteration is desired (block 676). In some cases, as a default seven local iterations are allowed per each global iteration. Based upon the disclosure provided herein, one of ordinary skill in the art will recognize another default number of local iterations that may be used in relation to different embodiments of the present invention. Where another local iteration is desired (block 676), the data decode algorithm is re-applied using the current decoded output as a guide (block 666).

Alternatively, where another local iteration is not desired (block 676), it is determined whether another global iteration is allowed (block 681). As a default, another global iteration is allowed where there is sufficient available space in the central memory and an output memory reordering queue to allow another pass through processing the currently processing codeword. Where another global iteration is allowed (block 681), a derivative of the decoded output is stored to the central memory (block 691). The process of data detection beginning at block 635 of FIG. 6a may then be re-applied to the decoded output. Alternatively, where another global iteration is not allowed (block 681), a failure to converge is indicated (block 686), and the current decoded output is provided.

Alternatively, where estimated framing is indicated for any of the fragments of the received codeword (block 611), a re-alignment of the data within the sample buffer is performed using a comparison of the detected output and decoded output for fragments associated with the estimated framing. This process includes selecting a codeword corresponding to an estimated framing indicating mis-alignment of at least one fragment of the codeword (block 616). Data decoding is applied to all codewords associated with the same parity codeword to yield parity information for the selected codeword using cross-codewords error correction (block 621). The resulting parity information is stored (block 626). The parity information is then compared with corresponding locations in the detected output for the selected codeword (block 636). It is determined whether there is a correlation between the parity information and the selected window of the selected codeword (block 641). Such a correlation may be determined by calculating a Euclidean distance between a portion of the parity information and a current window of the detected output, and comparing the Euclidean distance with a threshold value. Based upon the disclosure provided herein, one of ordinary skill in the art will recognize other approaches for determining a correlation that may be used in relation to different embodiments of the present invention.

Where a correlation is not found (block 641), the window of comparison within the detected output is modified or slid (block 646) and the process of comparing is performed anew using the new window of the detected output (block 636). Alternatively, where a correlation is found (block 641), a mis-alignment value is calculated for the fragment associated with the estimated framing (block 651). The equalized output stored in the sample buffer is then updated by aligning the fragment associated with the estimated framing to reflect the calculated mis-alignment value (block 656), and the estimated framing associated with the fragment is erased as it has been corrected (block 661).

It is then determined whether another codeword of the codewords associated with the parity codeword is associated with another estimated framing (block 602). Where another codeword including a fragment where a sync mark is missed remains (block 602), the next codeword corresponding to an estimated framing is selected (block 607) and the processes of blocks 621-661 are repeated for the selected codeword. Alternatively, where no codewords associated with a missing sync mark remain (block 602), the processing of the codewords associated with the parity codeword is re-started by re-applying the data detection algorithm of block 635 of FIG. 6a.

Figure 7A:
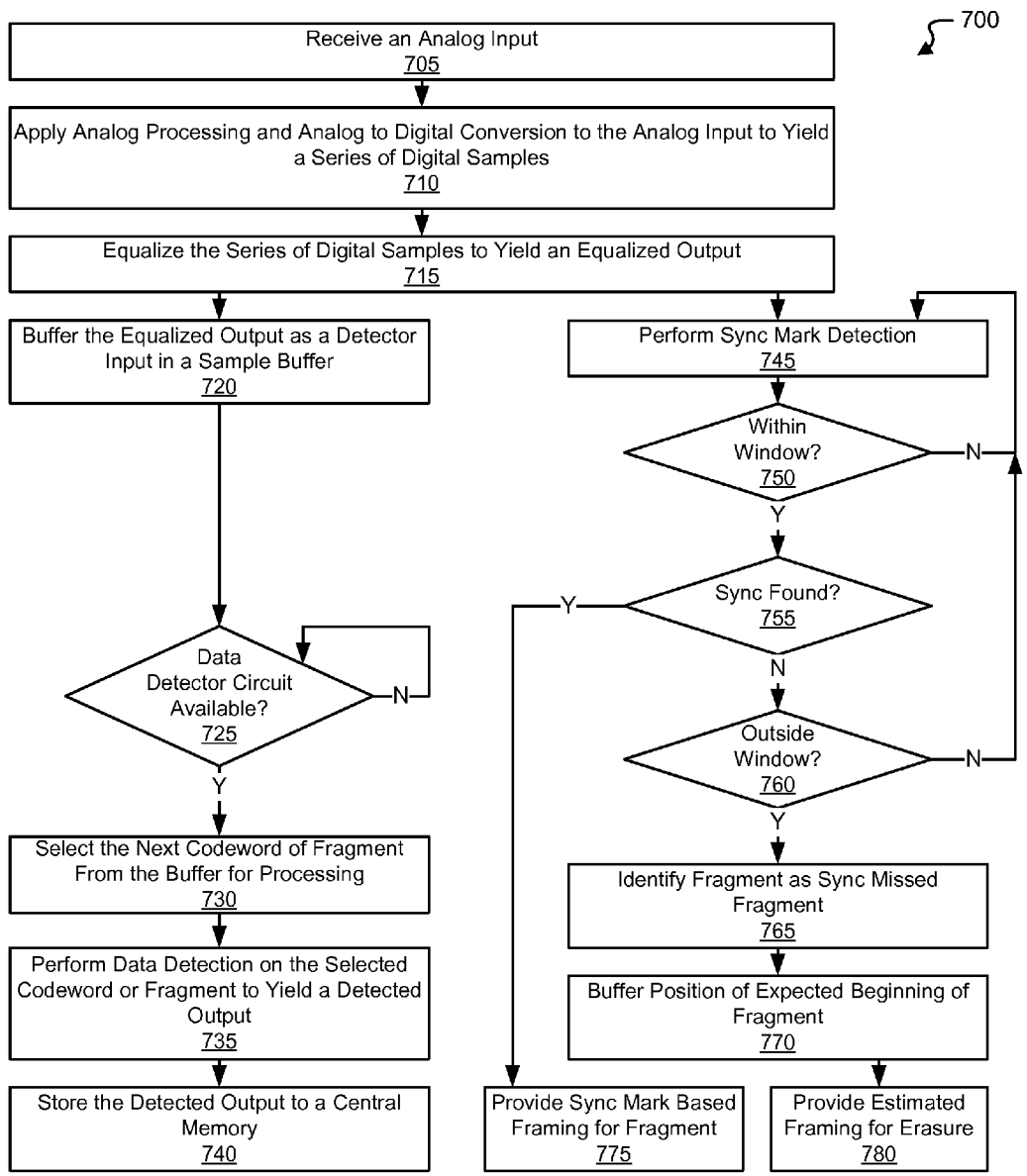
FIGS. 7a-7b are flow diagrams showing a method in accordance with various embodiments of the present invention for re-aligning data using correlation with a decoded output generated using cross codewords error correction information.
Figure 7B:
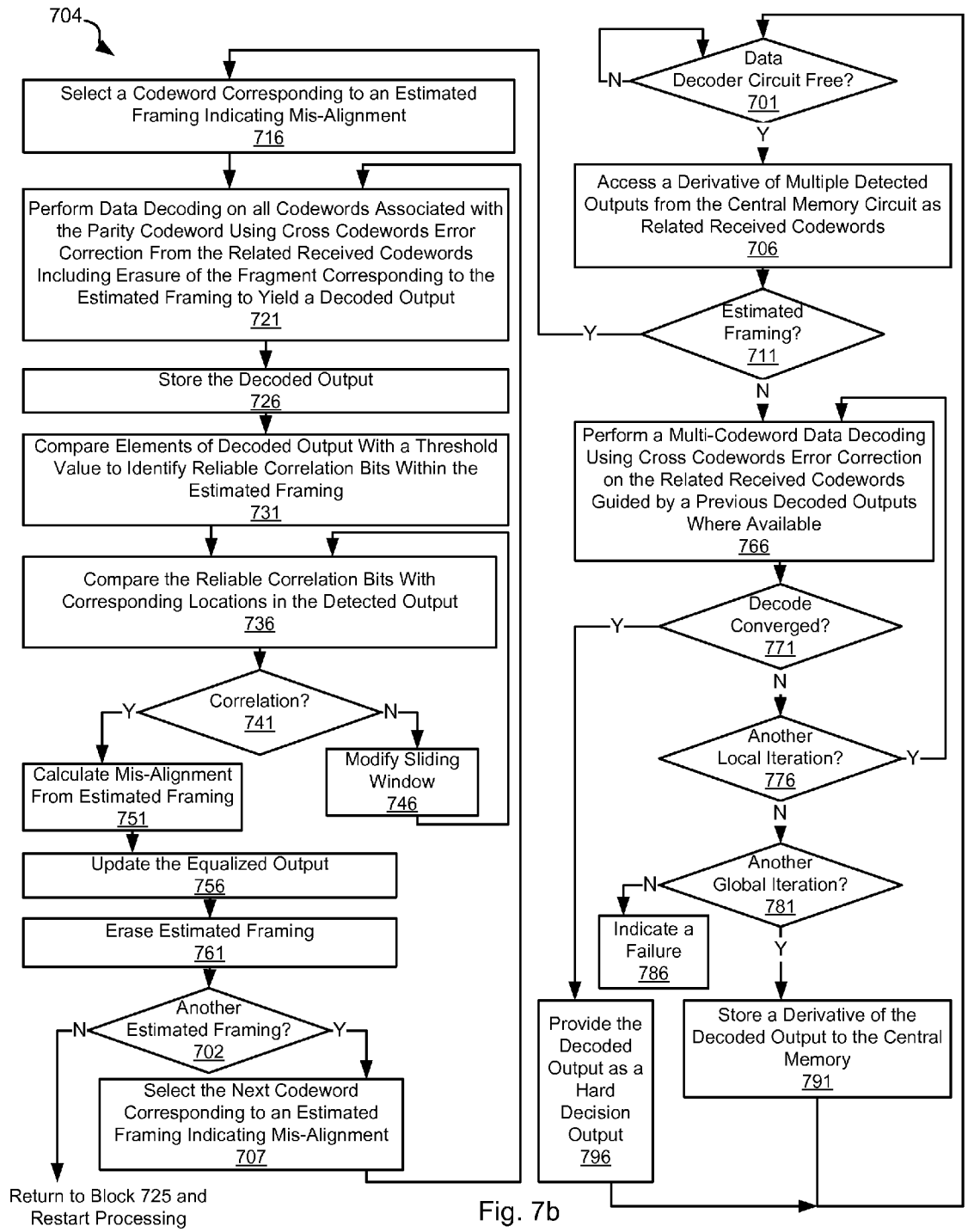

Turning to FIGS. 7a-7b, flow diagrams 700, 704 show a method in accordance with various embodiments of the present invention for re-aligning data using correlation with a decoded output from a multi-codeword data decoding.

Following flow diagram 700 of FIG. 7a, an analog input is received (block 605). The analog input may be derived from, for example, a read head flying over a track of a storage medium. Based upon the disclosure provided herein, one of ordinary skill in the art will recognize a variety of sources of the analog input. Analog processing is applied to the analog input to yield a processed analog input, and the processed analog input is converted to a series of digital samples (block 610). The analog processing may include, but is not limited to, analog filtering and/or amplification. The analog to digital conversion may be done using an analog to digital converter circuit or system as are known in the art. Of note, any circuit known in the art that is capable of converting an analog signal into a series of digital values representing the received analog signal may be used.

The series of digital samples are equalized to yield an equalized output (block 615). In some cases, the aforementioned equalization may be done using a digital finite impulse response equalizer circuit as are known in the art, however, other approaches to equalization may be used in relation to different embodiments of the present invention. The resulting equalized output is buffered as a detector input in a sample buffer (block 620). The data within the sample buffer is aligned in fragments (e.g., corresponding to fragments 122a, 122b, 122c) based upon the locations of identified sync marks (see block 675 below) or an estimated framing where a sync mark is not found (see block 680 below).

In addition, it is determined whether the currently received equalized output is within a window where a sync mark is expected (block 650). Thus, using FIG. 1b as an example, it may be determined whether the currently received equalized output is within a region around which sync mark 180 is to be expected. In some cases, the window may be defined as a region surrounding a location where the next sync mark is expected based upon a distance from a previously identified sync mark or estimated sync mark. Where the currently received equalized output is not within the defined window (block 650), sync mark detection is not performed. Alternatively, where the currently received equalized output is within the defined window (block 650), sync mark detection is performed to determine whether a sync mark is found in the recently received equalized output (block 645). Such sync mark detection may employ any method known in the art for identifying a sync mark within a data set. In one particular embodiment, a defined sync mark pattern is compared with a sliding series of instances of equalized output. Where the comparison indicates a Euclidean distance less than a defined threshold, a sync mark is identified (i.e., a sync is found)(block 655). Alternatively, a sync mark is not identified (block 655).

Where a sync is found (block 655), a sync mark found signal is asserted and the location at which the sync mark is found is used to align data along fragment and/or codeword boundaries in the sample buffer (block 675). Alternatively, where a sync is not found (block 655), it is determined whether the next equalized output will be outside of the window (block 660). Where the next equalized output will not be outside the window (block 660), the processes of blocks 650-460 are repeated for the next equalized output. Otherwise, where the next equalized output will be outside the window (block 660), the sync mark has been missed. In such a condition, the fragment corresponding to the missed sync mark is identified as a sync missed fragment (block 665) and a position where the sync mark was expected is buffered as an estimated framing (block 680). As an example, where the window where the sync mark is expected to be found corresponds to an expected location of header 121c of FIG. 1b, the estimated framing may indicate the beginning of header 121c or some offset into header 121c. In such a case, the corresponding codeword fragment within the sample buffer will be only approximately aligned using the estimated framing.

It is determined whether a data detector circuit is available (block 625). Where the data detector circuit is available (block 625), the next codeword or fragment (i.e., a portion of the equalized output aligned using either the estimated framing or sync mark) from the sample buffer is selected for processing (block 630), and a data detection is performed on the selected codeword or fragment to yield a detected output (block 635). The data detection may be, but is not limited to, a Viterbi algorithm data detection or a maximum a posteriori data detection. Based upon the disclosure provided herein, one of ordinary skill in the art will recognize other data detection algorithms that may be used in relation to different embodiments of the present invention. The detected output is then stored to a central memory where it awaits the availability of a downstream data decoder circuit (block 640).

Turning to FIG. 7b and following flow diagram 704, in parallel to the previously described data detection process, it is determined whether a data decoder circuit is available (block 701). The data decoder circuit may be, for example, a low density data decoder circuit as are known in the art. Where the data decoder circuit is available (block 701), a previously stored derivative of a detected output is accessed from the central memory and used as a received codeword (block 706). It is determined whether estimated framing is indicated for one or more fragments (e.g., fragments 122a, 122b, 122c) of the received codeword (block 711). Estimated framing indicates that a sync mark for a fragment was missed and that the alignment of data within a sample buffer is just approximated based upon an expected sync mark location.

Where estimated framing is not indicated for any of the fragments of the received codeword (block 711), a multi-codeword data decode algorithm is applied to the received codeword to yield a decoded output (block 766). Such a multi-codeword data decoding algorithm applies a standard data decoding algorithm to individual codewords including both data codewords and a parity codeword, and uses any converged codewords along with the parity codeword to correct any remaining errors in one or more non-converging codewords where possible. It is then determined whether the decoded output converged (e.g., resulted in the originally written data as indicated by the lack of remaining unsatisfied checks) (block 771). Where the decoded output converged (block 771), the converged codeword is converted and provided as a hard decision output (block 796).

Alternatively, where the decoded output failed to converge (e.g., errors remain) (block 771), it is determined whether another local iteration is desired (block 776). In some cases, as a default seven local iterations are allowed per each global iteration. Based upon the disclosure provided herein, one of ordinary skill in the art will recognize another default number of local iterations that may be used in relation to different embodiments of the present invention. Where another local iteration is desired (block 776), the data decode algorithm is re-applied using the current decoded output as a guide (block 766).

Alternatively, where another local iteration is not desired (block 776), it is determined whether another global iteration is allowed (block 781). As a default, another global iteration is allowed where there is sufficient available space in the central memory and an output memory reordering queue to allow another pass through processing the currently processing codeword. Where another global iteration is allowed (block 781), a derivative of the decoded output is stored to the central memory (block 791). The process of data detection beginning at block 735 of FIG. 7a may then be re-applied to the decoded output. Alternatively, where another global iteration is not allowed (block 781), a failure to converge is indicated (block 786), and the current decoded output is provided.

Alternatively, where estimated framing is indicated for any of the fragments of the received codewords (block 711), a re-alignment of the data within the sample buffer is performed using a comparison of the detected output and decoded output for fragments associated with the estimated framing. This process includes selecting one codeword having a fragment corresponding to the estimated framing (block 716). The elements of the selected codeword corresponding to the estimated framing are erased, and multi-codeword data decoding is applied to the codewords associated with a common parity codeword including the erased portion of the selected codeword to yield a decoded output (block 721). Such erasure may include, but is not limited to, setting the corresponding soft information in the detected output to a value indicating a high improbability that the elements are correct. This assures maximum freedom in changing the elements when the data decoding algorithm is applied. Thus, for example, where the received codewords correspond to codewords 142, 143, 144, 145 and encoded user data 122b of codeword 142 is associated with the estimated framing, then elements within the detected output corresponding to encoded user data 122b are erased. Notably, elements within the detected output corresponding to, inter alia, encoded user data 122a and encoded user data 122c are not erased. Application of the data decoding algorithm results in a modification of elements corresponding to the fragment associated with the estimated framing. These changes are based upon parity data included in the received codeword and the soft data from the fragments not associated with the estimated framing, and are not influenced by any mis-alignment of a fragment associated with the estimated framing as such fragments were previously erased. Said another way, elements of the resulting decoded output provide a rough representation of the data that should have been found in the fragment where the sync mark was missed. The resulting decoded output is stored (block 726).

The soft data of elements of the resulting decoded output corresponding to the fragment where the sync mark was missed are each compared with a threshold value to identify reliable correlation bits (block 731). Thus, for example where a log likelihood ratio of a particular element in the decoded output is below a threshold (i.e., is less likely to be correct), it is excluded from a set of reliable bit positions where reliable correlation bits are found. Alternatively, where a log likelihood ratio of a particular element in the decoded output is equal to or above a threshold (i.e., is more likely to be correct), it is included in the set of reliable bit positions where reliable correlation bits are found.

The aforementioned reliable correlation bits are compared with bit values distributed correspondingly within the detected output to find a location of correlation (block 736). Thus, for example, the set of reliable bit positions may include a position X+1, a position X+3, a position X+34 and a position X+61 where X is the offset into the decoded output corresponding to the beginning of the fragment associated with the estimated framing within the sample buffer. In such a case, the elements of the decoded output for these positions are compared across the detected output to identify a correlated distribution (i.e., is there a location in the detected output that shows similar reliable correlation bits at a spacing that is the same as the reliable bit positions). This process of comparison may be done by comparing the reliable correlation bits distributed as set forth in the set of reliable bit positions with a sliding window of the detected output.

It is determined whether a correlation is found (block 741). Where the aforementioned comparison process includes calculating a Euclidean distance, then determination of whether a correlation is found includes comparing the Euclidean distance with a threshold. Where a correlation is not found (block 741), the window of comparison within the detected output is modified or slid (block 746) and the process of comparing is performed anew using the new window of the detected output (block 736). Alternatively, where a correlation is found (block 741), a mis-alignment value is calculated for the fragment associated with the estimated framing (block 751). Thus, using the preceding example, where the reliable correlation bits correspond to the following positions: position Y+1, a position Y+3, a position Y+34 and a position Y+61, where Y is the offset into the codeword in the sample buffer, then the mis-alignment is calculated as Y−X (i.e., the offset between the decoded data and the samples in the sample buffer). The equalized output stored in the sample buffer is then updated by aligning the fragment associated with the estimated framing to reflect the calculated mis-alignment value (block 756), and the estimated framing associated with the fragment is erased as it has been corrected (block 761).

It is then determined whether another codeword of the codewords associated with the parity codeword is associated with another estimated framing (block 702). Where another codeword including a fragment where a sync mark is missed remains (block 702), the next codeword corresponding to an estimated framing is selected (block 707) and the processes of blocks 721-761 are repeated for the selected codeword. Alternatively, where no codewords associated with a missing sync mark remain (block 702), the processing of the codewords associated with the parity codeword is re-started by re-applying the data detection algorithm of block 735 of FIG. 7a.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In other cases, the one part of a given system, block or circuit may be implemented in software or firmware, while other parts are implemented in hardware.

In conclusion, the invention provides novel systems, devices, methods and arrangements for processing data from a storage medium. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. A data processing system, the system comprising:
   a sample buffer circuit operable to store a sample data set;
   a data detector circuit operable to apply a data detection algorithm to the sample data set to yield a detected output, wherein a fragment of the sample data set is mis-aligned;
   a data decoder circuit operable to apply a data decoding algorithm to a decoder input to yield an interim output, wherein the decoder input is derived from the detected output; and
   a mis-alignment determination circuit operable to determine a mis-alignment value of the sample data set based upon a combination of the detected output and the interim output, wherein the mis-alignment determination circuit includes:
      a threshold comparison circuit operable to compare instances of the interim output with a threshold value to yield a signature, wherein the signature includes a set of reliable correlation bits and corresponding reliable bit positions; and
      a correlation circuit operable to identify a position in the detected output that exhibits a correlation to the signature.

2. The data processing system of claim 1, the system further comprising:
   a sync mark detection circuit operable to identify a sync mark in a received data set; and
   wherein a mis-alignment of the sample data set is caused by a failure of the sync mark detection circuit to identify the sync mark in the received data set.

3. The data processing system of claim 1, wherein the correlation circuit is further operable to calculate the mis-alignment value based upon the identified position in the detected output.

4. The data processing system of claim 1, wherein the interim output includes soft data for bit positions generated as part of applying the data decoding algorithm.

5. The data processing system of claim 1, wherein the sample data set is a fragment of a first codeword associated with a parity codeword, wherein the sample buffer is further operable to store a second codeword associated with the parity codeword, and the parity codeword, and wherein the interim output includes parity information generated based at least in part on the parity codeword and the second codeword.

6. The data processing system of claim 1, wherein the sample data set is a fragment of a first codeword associated with a parity codeword, wherein the sample buffer is further operable to store a second codeword associated with the parity codeword, and the parity codeword, and wherein the interim output includes soft data for bit positions generated based at least in part on a combination of the parity codeword and the second codeword.

7. The data processing system of claim 1, wherein the data decoder circuit is a low density parity check decoder circuit.

8. The data processing system of claim 1, wherein the data detector circuit is a maximum a posteriori data detector circuit.

9. The data processing system of claim 1, wherein the sample buffer circuit is operable to re-align the sample data set based at least in part on the mis-alignment value of the sample data set.

10. The data processing system of claim 1, wherein the system is implemented as part of an integrated circuit.

11. The data processing system of claim 1, wherein the system is incorporated in a hard disk drive including a storage medium and a read/write head assembly disposed in relation to the storage medium.

12. A method for data processing, the method comprising:
    storing a sample data set to a storage buffer circuit, wherein the sample data set is mis-aligned;
    applying a data detection circuit to the sample data set to yield a detected output;
    applying a data decoding circuit to a decoder input to yield an interim output, wherein the decoder input is derived from the detected output;
    using a correlation circuit to:
       generate a correlation value corresponding to a difference between the detected output and a signature, wherein the signature is derived from the interim output;
       determine a correlation occurrence based at least in part on the correlation value; and
       determine a mis-alignment value for the correlation occurrence; and
    using a sync mark detection circuit to identify a sync mark in a received data set, wherein a mis-alignment of the sample data set is caused by a failure of the sync mark detection circuit to identify the sync mark in the received data set; and
    re-aligning the sample data set to yield a re-aligned sample data set, wherein the sample data set if re-aligned based at least in part on one or both of (i) the mis-alignment value and (ii) the failure to identify the sync mark in the received data set.

13. The method of claim 12, wherein the method further comprises:
    comparing instances of the interim output with a threshold value to yield the signature, wherein the signature includes a set of reliable correlation bits and corresponding reliable bit positions.

14. The method of claim 12, wherein the detected output is a first detected output and the decoder input is a first decoder input, the method further comprising:
    applying the data detection algorithm to the re-aligned sample data set to yield a second detected output; and
    applying the data decoding algorithm to a second decoder input to yield a decoded output, wherein the second decoder input is derived from the second detected output.

15. The method of claim 12, the method further comprising:
    applying a sync mark detection to an input data set to identify a sync mark within the input data set, wherein the sample data set corresponds to the input data set; and
    wherein the mis-alignment of the sample data set results from a failure to detect a sync mark within an expected range of elements of the input data set.

16. The method of claim 12, wherein the correlation value is a Euclidean distance between the detected output and the signature, and wherein the correlation occurrence occurs at a position where the Euclidean distance is less than a threshold value.

17. The method of claim 16, wherein the threshold value is user programmable.

18. A storage device, the storage device comprising:
a storage medium;
a read/write head disposed in relation to the storage medium and operable to provide an analog input corresponding to information sensed on the storage medium;
a read channel circuit, the read channel circuit including:
an analog processing circuit operable to generate a sample data set based upon the analog input;
a sample buffer circuit operable to store the sample data set, wherein a fragment of the sample data set is mis-aligned;
a data detector circuit operable to apply a data detection algorithm to the sample data set to yield a detected output, wherein a fragment of the sample data set is mis-aligned;
a data decoder circuit operable to apply a data decoding algorithm to a decoder input to yield an interim output, wherein the decoder input is derived from the detected output; and
a mis-alignment determination circuit operable to determine a mis-alignment value of the sample data set based upon a combination of the detected output and the interim output.

19. The storage device of claim 18, wherein the mis-alignment determination circuit includes:
a threshold comparison circuit operable to compare instances of the interim output with a threshold value to yield a signature, wherein the signature includes a set of reliable correlation bits and corresponding reliable bit positions; and
a correlation circuit operable to:
identify a position in the detected output that exhibits a correlation to the signature; and
calculate the mis-alignment value based upon the identified position in the detected output.

20. The method of claim 13, wherein the method further comprises:
identifying a position in the detected output that exhibits a correlation to the signature.

* * * * *